(12) United States Patent
Johnson

(10) Patent No.: US 8,783,138 B2
(45) Date of Patent: *Jul. 22, 2014

(54) HIGH DENSITY TOOL BIT HOLDER

(71) Applicant: Robyn Marie Johnson, Milford, CT (US)

(72) Inventor: Robyn Marie Johnson, Milford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/773,792

(22) Filed: Feb. 22, 2013

(65) Prior Publication Data

US 2013/0161915 A1    Jun. 27, 2013

Related U.S. Application Data

(63) Continuation of application No. 12/796,262, filed on Jun. 8, 2010, now Pat. No. 8,430,003.

(60) Provisional application No. 61/268,135, filed on Jun. 9, 2009, provisional application No. 61/276,376, filed on Sep. 11, 2009, provisional application No. 61/342,375, filed on Apr. 12, 2010.

(51) Int. Cl.
| | |
|---|---|
| *B25B 23/00* | (2006.01) |
| *B23Q 13/00* | (2006.01) |
| *B25G 1/06* | (2006.01) |
| *B25G 1/08* | (2006.01) |
| *B25B 15/00* | (2006.01) |
| *B25F 5/02* | (2006.01) |

(52) U.S. Cl.
CPC ............... *B23Q 13/00* (2013.01); *B25G 1/063* (2013.01); *B25B 23/0028* (2013.01); *B25G 1/085* (2013.01); *B25B 15/008* (2013.01); *B25F 5/029* (2013.01)

USPC .............................................. 81/439; 81/490

(58) Field of Classification Search
CPC .... B23Q 13/00; B25B 15/08; B25B 23/0028; B25G 1/085; B25G 1/063; B25F 5/029
USPC .......... 81/427.5, 490, 177.4, 177.8, 125, 450, 81/177.9, 438, 439, 489; 7/167, 168, 165; 16/111.1, 430, 436, 438
See application file for complete search history.

(56) References Cited

U.S. PATENT DOCUMENTS

| | | |
|---|---|---|
| 1,398,583 A | 11/1921 | Bovee |
| 1,787,424 A | 1/1931 | Altenbach |
| 2,804,970 A | 9/1957 | Kuc et al. |
| 3,061,927 A | 11/1962 | Von Frankenberg |
| 3,364,508 A | 1/1968 | Garrett |
| 3,667,518 A | 6/1972 | Stillwagon, Jr. |
| 4,261,103 A | 4/1981 | Heck |
| 4,384,499 A | 5/1983 | Shockley |

(Continued)

OTHER PUBLICATIONS

U.S. Appl. No. 12/796,262, filed Jun. 8, 2010, 8,430,003.

*Primary Examiner* — Robert Pezzuto
(74) *Attorney, Agent, or Firm* — McCarter & English, LLP

(57) ABSTRACT

Exemplary embodiments are directed to tool bit holders that generally include a tool bit cartridge defined by side walls located opposite and facing away from each other, and at least one end wall that defines a curved, angled or staggered geometry. The exemplary tool bit holders generally include a pivot point located on the side walls of the tool bit cartridge. The tool bit cartridge includes tool bit storage holes in the at least one end wall. The tool bit cartridge generally rotates about the pivot point within a cavity of a device.

20 Claims, 34 Drawing Sheets

(56) References Cited

U.S. PATENT DOCUMENTS

| | | |
|---|---|---|
| 4,452,289 A | 6/1984 | Smith |
| 4,848,197 A | 7/1989 | Kikel |
| 4,983,080 A | 1/1991 | Somers |
| 5,062,173 A | 11/1991 | Collins et al. |
| 5,146,815 A | 9/1992 | Scott, III |
| 5,174,698 A | 12/1992 | Obermeier |
| 5,265,504 A | 11/1993 | Fruhm |
| 5,271,300 A | 12/1993 | Zurbuchen et al. |
| 5,320,004 A | 6/1994 | Hsiao |
| 5,346,453 A | 9/1994 | Rivera |
| 5,450,774 A | 9/1995 | Chang |
| 5,522,291 A | 6/1996 | Liv |
| 5,562,208 A | 10/1996 | Hasler |
| 5,581,834 A | 12/1996 | Collins |
| 5,592,859 A | 1/1997 | Johnson et al. |
| 5,613,413 A | 3/1997 | Huang |
| 5,641,066 A | 6/1997 | Maslaro |
| 5,669,492 A | 9/1997 | Chao |
| D385,172 S | 10/1997 | Bramsiepe et al. |
| 5,711,042 A | 1/1998 | Chuang |
| 5,711,194 A | 1/1998 | Anderson et al. |
| 5,740,706 A | 4/1998 | Tseng |
| 5,765,454 A | 6/1998 | Barbulescu |
| 5,791,211 A | 8/1998 | Bondhus et al. |
| 5,802,936 A | 9/1998 | Liu |
| 5,819,612 A | 10/1998 | Anderson et al. |
| 5,881,615 A | 3/1999 | Dahl et al. |
| 5,887,306 A * | 3/1999 | Huang ............... 7/165 |
| 5,896,606 A | 4/1999 | Huang |
| 5,927,162 A * | 7/1999 | Huang ............... 81/177.8 |
| 5,927,164 A | 7/1999 | Anderson et al. |
| 5,931,318 A | 8/1999 | Shauo |
| 5,967,641 A | 10/1999 | Sung et al. |
| 5,970,553 A | 10/1999 | Lin |
| 5,970,828 A | 10/1999 | Bondhus et al. |
| 6,033,163 A | 3/2000 | Anderson et al. |
| 6,065,598 A | 5/2000 | Anderson et al. |
| 6,082,232 A | 7/2000 | Anderson et al. |
| 6,085,620 A | 7/2000 | Anderson et al. |
| 6,109,147 A | 8/2000 | Legg |
| 6,109,148 A | 8/2000 | Anderson et al. |
| 6,119,560 A | 9/2000 | Anderson et al. |
| 6,119,561 A | 9/2000 | Anderson et al. |
| 6,119,859 A | 9/2000 | Wen |
| 6,131,222 A | 10/2000 | Anderson et al. |
| 6,196,093 B1 | 3/2001 | Hu |
| 6,209,428 B1 | 4/2001 | Anderson et al. |
| 6,237,451 B1 | 5/2001 | Wei |
| 6,243,901 B1 | 6/2001 | Elsener et al. |
| 6,243,902 B1 | 6/2001 | Huang |
| 6,257,106 B1 | 7/2001 | Anderson et al. |
| 6,286,168 B1 | 9/2001 | Woodruff et al. |
| 6,286,397 B1 | 9/2001 | Taggart et al. |
| 6,298,756 B1 | 10/2001 | Anderson et al. |
| 6,305,256 B1 | 10/2001 | Anderson et al. |
| 6,308,599 B1 | 10/2001 | Fu-Hvi |
| 6,314,600 B1 * | 11/2001 | Cachot ............... 7/128 |
| 6,318,218 B1 | 11/2001 | Anderson et al. |
| 6,352,010 B1 | 3/2002 | Giarritta |
| 6,397,709 B1 | 6/2002 | Wall |
| 6,415,923 B1 | 7/2002 | Chen |
| 6,435,065 B2 | 8/2002 | Kozak |
| 6,634,262 B2 | 10/2003 | Malchus |
| 6,634,502 B1 | 10/2003 | Yu |
| 6,637,061 B1 | 10/2003 | Spracklin et al. |
| 6,640,675 B1 * | 11/2003 | Chuang ............... 81/490 |
| 6,751,819 B2 | 6/2004 | Chuang |
| 6,752,268 B1 | 6/2004 | Wadsworth |
| 6,851,339 B2 | 2/2005 | Casel |
| 6,868,760 B1 | 3/2005 | Johnson |
| 6,877,186 B2 * | 4/2005 | Shiao ............... 16/111.1 |
| 6,902,356 B2 | 6/2005 | Breitenmoser |
| 6,915,900 B2 | 7/2005 | Chen |
| 6,941,843 B2 | 9/2005 | Johnson et al. |
| 6,968,760 B2 | 11/2005 | Hu |
| 6,976,410 B2 | 12/2005 | Anderson et al. |
| 6,983,506 B1 | 1/2006 | Brown |
| 7,011,212 B2 | 3/2006 | Thomson |
| 7,032,750 B2 | 4/2006 | Amtenbrink |
| 7,047,847 B2 | 5/2006 | Chuang |
| 7,066,061 B1 * | 6/2006 | Chen et al. ............... 81/439 |
| 7,073,417 B2 | 7/2006 | Beachamp |
| D528,395 S | 9/2006 | Schluter |
| 7,146,889 B2 | 12/2006 | Kang |
| 7,182,002 B2 | 2/2007 | Hu |
| 7,185,569 B2 | 3/2007 | Knight et al. |
| D542,111 S | 5/2007 | Te |
| 7,281,454 B2 | 10/2007 | Johnson |
| 7,281,455 B2 | 10/2007 | Hu |
| 7,284,466 B1 | 10/2007 | Ho |
| 7,328,796 B2 | 2/2008 | Brunson |
| 7,380,660 B2 | 6/2008 | Lin |
| 7,383,755 B1 | 6/2008 | Kang |
| 7,387,055 B2 | 6/2008 | Liu |
| 7,481,137 B1 | 1/2009 | Johnson |
| 7,530,129 B2 | 5/2009 | Yale |
| 7,530,459 B2 | 5/2009 | Yeh |

\* cited by examiner

HIGH DENSITY TOOL BIT HOLDER

CROSS REFERENCE TO RELATED APPLICATIONS

The present application is a continuation application that claims the benefit of a co-pending, non-provisional patent application entitled "High Density Tool and Locking Mechanism," which was filed on Jun. 8, 2010, as Ser. No. 12/796,262, which claims priority benefit to three (3) provisional patent applications, as follows: (i) a first provisional application entitled "Split Tools," which was filed on Jun. 9, 2009, as Ser. No. 61/268,135; (ii) a second provisional application entitled "Split Tools," which was filed on Sep. 11, 2009, as Ser. No. 61/276,376; and (iii) a third provisional application entitled "High Density Tool and Locking System," which was filed on Apr. 12, 2010, as Ser. No. 61/342,375. The entire content of the foregoing applications is incorporated herein by reference.

FIELD OF THE INVENTION

This invention relates to better methods of producing hand tools that store and make readily accessible a greater quantity of tools to perform a given task. The noted objectives are realized by unique techniques of tool storage and retrieval from within the space provided in the handles of both manual hand tools and power hand tools.

BACKGROUND OF THE INVENTION

Hand toolkits consisting of folding elongated tools and hand toolkits comprised of a handle with a driver shaft that accept interchangeable tool bits have long benefited tradesmen, hobbyist and homeowners alike. These toolkits generally include a plurality of related tools arranged in an assortment of sizes for a given tool type, such as screwdrivers, hex wrenches and Torx drivers, or arranged as a variety of tools each with different functions that might be used to perform a given undertaking, such as sets of common tools for repairing a bicycle or tools commonly used by fishermen. It is conceivable that manual or power hand toolkits of this nature can be produced to benefit any conceivable sport, hobby or trade.

Although tradesmen, hobbyists and homeowners are benefited with the convenience of an organized set of tools situated in a common holder to perform the task at hand, often they have had to depend on the relatively small assortment of tools contained in a toolkit before accessing additional tools to finish a task from a separate toolbox or storage device. An example might be that to perform a given task, the user may not know by visual inspection if a metric or fractional-inch (SAE) hex wrench is needed or might require a set of both metric and SAE hex wrenches and would presently have to rely on two separate toolkits.

Thus, a need exists for improved toolkits and systems that better meet the needs of tradesmen, hobbyists and/or homeowners. Such needs are satisfied according to the present disclosure through advantageous toolkits and systems. Thus, in exemplary embodiments, the present disclosure provides toolkits/systems that are able to accommodate both a full set of common metric and SAE hex wrenches in one toolkit. Additional advantages of this invention include mechanisms for retaining stored tools in location for storage, selection and use using either semi-secure or positive locking mechanisms. Additional advantageous features, functions and benefits of the present invention will be apparent from the description which follows, particularly when read in conjunction with the accompanying figures.

SUMMARY OF THE INVENTION

The present invention is generally directed to a hand tool/system that includes a handle with access from one or more sides to provide tool storage and retrieval. The hand tool/system also generally includes one or more multi-chambered tool bit cartridges that are either fixed or pivoting for tool storage and one or more tool drivers that are either fixed or pivoting. In addition, semi-secure and/or positive engagement locking mechanisms can be applied to the design of the multi-chambered tool bit cartridge and/or tool driver depending upon the design specifications and/or desired functional operation of implementations hereof.

The object of this invention pertains to optimizing the greatest quantity of fastener tool bits and extended folding tools that can be stored and carried in an organized fashion within the confines of a standard size tool handle, including features that allow greater flexibility in how they are used. The purpose of which is to provide the user of a given hand tool, regardless if it's a manual hand tool or a power hand tool, the means to perform a given task right in the palm of his/her hand, minimizing the need to retrieve additional similar tools or tool bits from a separate storage device. A standard size tool handle is defined as what has been found through decades of hand tool design to be a comfortable size that fits in the average size hand of a tradesman or do-it-yourselfer.

To achieve this stated objective, it is important to define the type or function, size range, access and arrangement of the tool bits or extended tools that can be comfortably accommodated within the confines of a tool handle. In that tool bits such as ¼ inch hex bit that has a function as a slotted, Phillips, hex, Torx, square or posi driver bit offer overall geometric dimensions that are relatively uniform in size for a given length, ¼ inch hex bits that function as nut drivers as well as sockets range considerably in the overall diameter in comparison to the size of the drive connection as well as from one another as they relate to the size of the specific fastener they are used for. For these reason different approaches to the design of multi-chambered tool bit cartridge has to be considered. Both fixed and pivoting multi-chambered tool bit cartridges are required to achieve an appropriate solution and to accomplish the stated object of this invention. Additionally, a feature that makes possible multiple size tool bit drivers to accommodate multiple size tool bit drive connections in the same size hand tool assembly without consuming additional space will equally apply to extended folding tools and therefore is also included as a solution to the stated objective of this invention.

To accumulate and access the maximum quantity of fastener tools it is important to first design a storage device that will keep each fastener tool in close proximity to each other as well as aligning each tool along the common geometric consistencies that exist between each tool in a X, Y, Z matrix that exploits these consistencies. Second it is important to provide access great enough to be able to pluck a given tool from the storage device given the limitations imposed in selecting and securely grasping a relatively small object. Thirdly, assuming that there is sufficient room within the confines of the hand tool handle, access to a second matrix on the reverse side of the storage device provides for the accumulation of additional fastener tools. Fourthly, considerations for strengthening a tool handle that has a large open portion in its center to accommodate a multi-chambered tool bit cartridge. Complying to the parameters of these four imposed design conditions and to accommodate the greatest selection of fastener tools the storage device must provide tool retrieval and storage in a three dimensional matrix of multiple columns and rows located on selective planes and that provides access from one or more sides. Additionally, depending upon the swing radius imposed by the geometry of the tools also influences the geometry of the tool holder; the tool holder can be of a flat design fixed within the tool handle or of a pivoting design that rotates from a secure home position for storage to an open and exposed position for selection.

The various objectives and advantages described in this summary of this present invention will be more readily understood from the following detailed description when read in conjunction with the appended drawings.

BRIEF DESCRIPTION OF THE DRAWINGS

To assist those of ordinary skill in the art in making and using the disclosed toolkits/systems, reference is made to the accompanying figures, wherein.

DETAILED DESCRIPTION OF EXEMPLARY EMBODIMENTS

Figure 1:
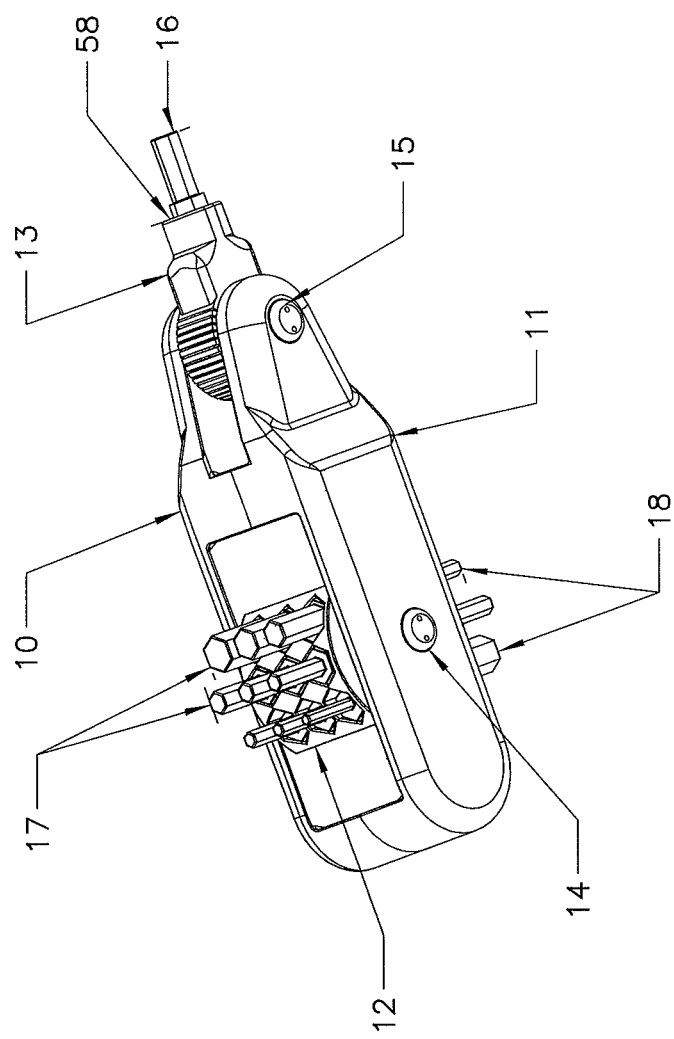
FIG. 1 Depicts a folding toolkit with a multi-chambered tool bit cartridge and tool driver in an extended and open position.

According to an exemplary embodiment of the present disclosure, FIG. 1 is an isometric view of a hand toolkit instrument which embodies a positional multi-chambered tool bit cartridge 12 in its open position for tool bit selection and a positional tool bit driver 13 in an open position for use. The handle sections 10 and 11 are shown to be held together with fastener components 14 and 15 although other means of joining the handle sections such as sonic welding or rivets could be employed. In some instances the handle could be a single component rather than two halves. An assortment of tool bits 17 and 18 are arranged on two ends of the multi-chambered tool bit cartridge 12 and fully exposed for selection. A tool bit 16 has been selected and inserted into a mating chamber 58 located in tool bit driver 13 for use.

Figure 2:
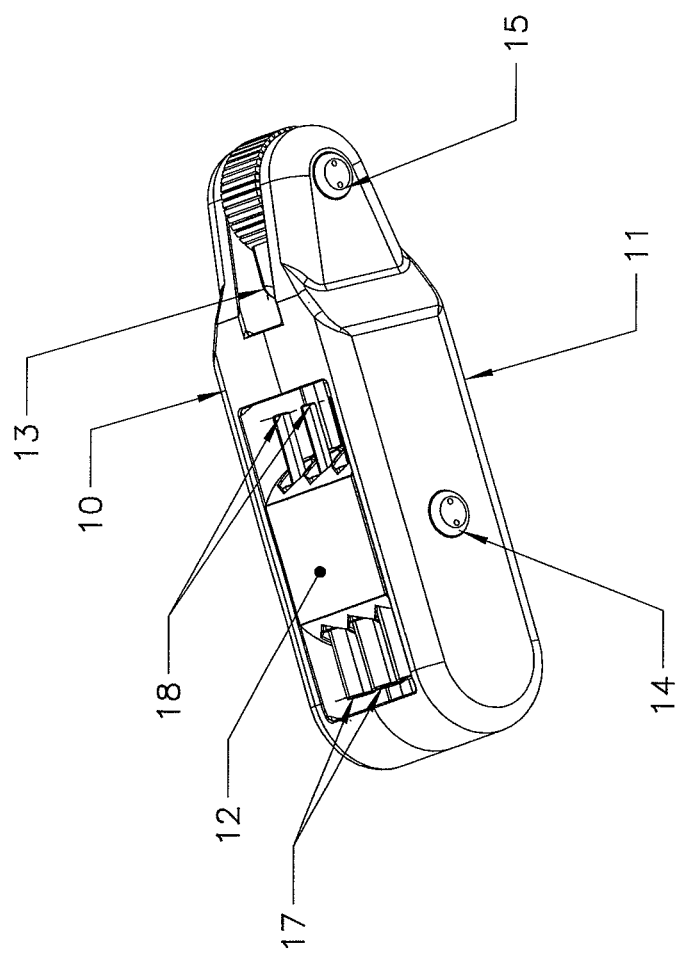
FIG. 2 Depicts a folding toolkit with a multi-chambered tool bit cartridge and tool driver in a retracted and closed position.

FIG. 2 is the same hand toolkit instrument as in FIG. 1, an isometric view which embodies a positional multi-chambered tool bit cartridge 12 in its closed or home position the tool bit driver 13 in a closed or home position and contained within the handle sections 10 and 11.

Figure 3:
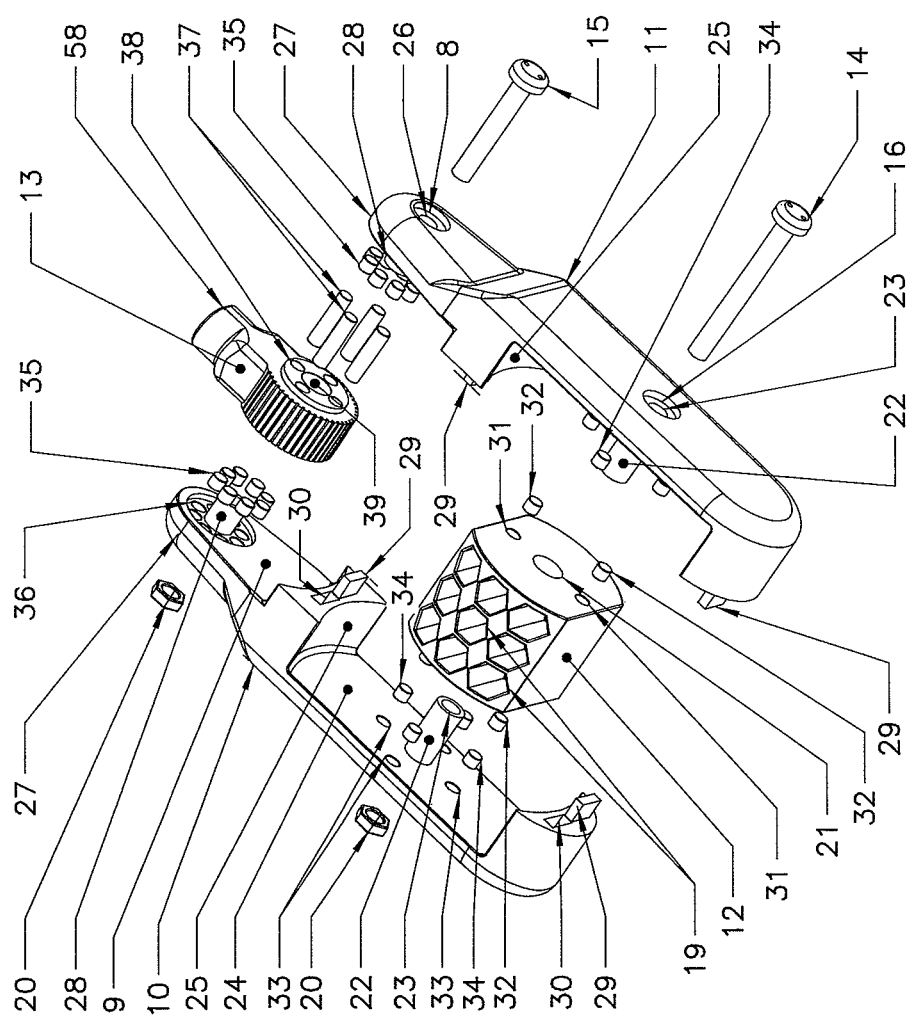
FIG. 3 An exploded view shows the same toolkit as in FIG. 1 and FIG. 2.

FIG. 3 is an exploded isometric view that illustrates assembly and positioning features of the present invention more clearly. The multi-chambered tool bit cartridge 12 revolves around a tubular shaped axle sleeve 22 shown here to be in two sections and attached to handle sections 10 and 11 although other manifestations of axle 22 can produce its same primary functions. In this view axle sleeve 22 has the functions of being the pivot point 21 for the multi-chambered tool bit cartridge 12, provide a pathway 23 to connect fastener components 14 and 20 to hold the handle sections 10 and 11 together and to perform the function of being a spacer that will prevent handle sections 10 and 11 from being compressed and thus rub against the multi-chambered tool bit cartridge 12 and restrict free rotation of the tool bit cartridge and assist in transferring torsion forces when applied during use more uniformly between both halves of the handle sections 10 and 11. Hole feature 30 mates with stem feature 29 to add additional strength. A small clearance gap between the inner walls 24 of handle section 10 and 11 should be maintained to allow free rotation and effective positioning of the multi-chambered tool bit cartridge 12. Located in the side walls of the multi-chambered tool bit cartridge 12 are hole provisions 31 that accommodate plugs 32, similarly hole provisions 33 are located in the inner walls 24 of the handle sections 10 and 11 that accommodate plugs 34.

The plugs located in both the handle sections and the tool bit cartridge are situated along equal circumscribed circumferences and can be situated on both sides of the tool bit cartridge and handles or one side of the tool bit cartridge and the same side of the handle that the one side flanks. There are two arrangements that the plugs 32 and 34 can comply with that will produce semi-secure positioning arraignments for the multi-chambered tool bit cartridge 12. First, both plugs 32 and 34 can be magnets with opposing magnetic fields attracting one another to a selected semi-secure position. Second either plug 32 or plug 34 can be magnets with the other being of a ferromagnetic material to attract the magnet. As a minimum, only one plug 32 or 34 located in the cartridge or handles is required to be a magnet while the quantity and angular placement of opposing magnets or ferromagnetic plugs located in the side walls of the flanking components along the circumscribed circumferences will determine the number and location of semi-secure positions for the multi-chambered tool bit cartridge 12. The same is true for the tool bit driver portion of the hand toolkit instrument. Where plugs 35 are situated in hole provisions 36 of the inside wall 9 of handle sections 10 and 11 and plugs 37 located in hole provisions 38 of the tool bit driver 13. Additionally, the tool bit driver 13 revolves around axle 28 shown here to be in two sections and attached to handle sections 10 and 11 although other manifestations of axle sleeve 28 can produce its primary functions. In this view axle sleeve 28 has the functions of being the pivot point 39 for the tool bit driver 13, provide a pathway 26 to connect fastener components 15 and 20 and to perform the function of being a spacer that will prevent handle sections 10 and 11 from being compressed and thus rub against the tool bit driver 13 and restrict free rotation of the tool bit driver.

A small clearance gap between the inner walls 9 of handle section 10 and 11 should be maintained to allow free rotation and effective positioning. Stem feature 29 along with the mating hole feature 30 with one or more locations on handle sections 10 and 11 add additional strength to the hand toolkit instrument especially when significant torque is applied to the tool bit driver. Another embodiment of this invention is the relationship between the inside wall radius 25 of handle sections 10 and 11 and the outside of the protruding end of tool bits 17 and 18 (shown in FIG. 1 and FIG. 2). Inside wall radius 25 performs several functions that include giving clearance for the tool bits 17 and 18 in that the they mimic a similar but slightly smaller radius when the multi-chambered tool bit cartridge 12 is pivoted to its closed and home position, the close proximity of the inside wall radius 25 prevents tool bits 17 and 18 from dislodging from multi-chambered tool bit cartridge 12 should the hand toolkit instrument be dropped or jostled and the shape of the radius 25 adds significant strength to the handle sections 10 and 11. This is further exampled in FIG. 7.

Figure 4:
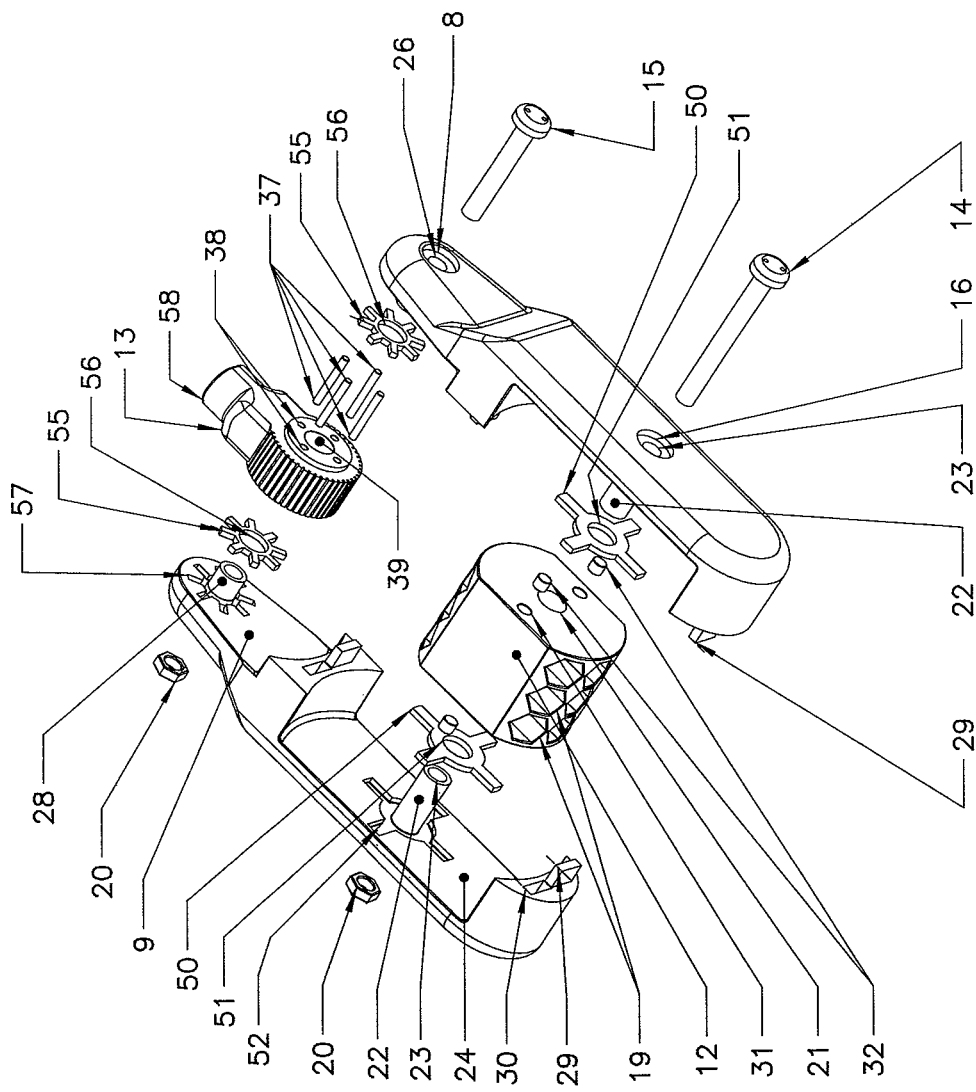
FIG. 4 A similar exploded view to that of FIG. 3 with similar features except with differences with semi-secure positioning approaches between FIG. 3 and FIG. 4 for the multi-chambered tool bit cartridge and tool driver FIG. 5 An exploded view of a folding toolkit with a multi-chambered tool bit cartridge and tool driver but of a simple design.

The types of magnets that will function best are permanent magnets that do not require a keeper or shunt to maintain the integrity of the magnet. A rare earth neodymium magnet is preferable. Other optional methods of maintaining the position of the multi-chambered tool bit cartridge 12 and bit driver 13 in relation to handle sections 10 and 11 are with a detent device such as a ball detent, a floating plate multiple position detent, a mechanical feature that provides a detent between the tool bit cartridge and handle as well as the tool bit driver and handle or a feature that provides friction between the handle and multi-chambered tool bit cartridge and/or tool bit driver A similar exploded isometric view is shown in FIG. 4 is to that of FIG. 3. The exception is that in place of hole provisions 33 and 36 as well as plugs 34 and 35 shown in FIG. 3, in FIG. 4 there are shown positioning plates 50 and 55 that situate in mating holes 52 and 57 respectfully. The positioning plates can be magnets or of a ferromagnetic material in a similar arrangement as they relate to similar components outlined in the description of FIG. 3. The quantity and angular placement of opposing magnets or ferromagnetic fingers located on the plates and in the side walls of the flanking components along the circumscribed circumferences will determine the number and location of semi-secure positions for the multi-chambered tool bit cartridge 12 and tool bit driver 13.

Figure 5:
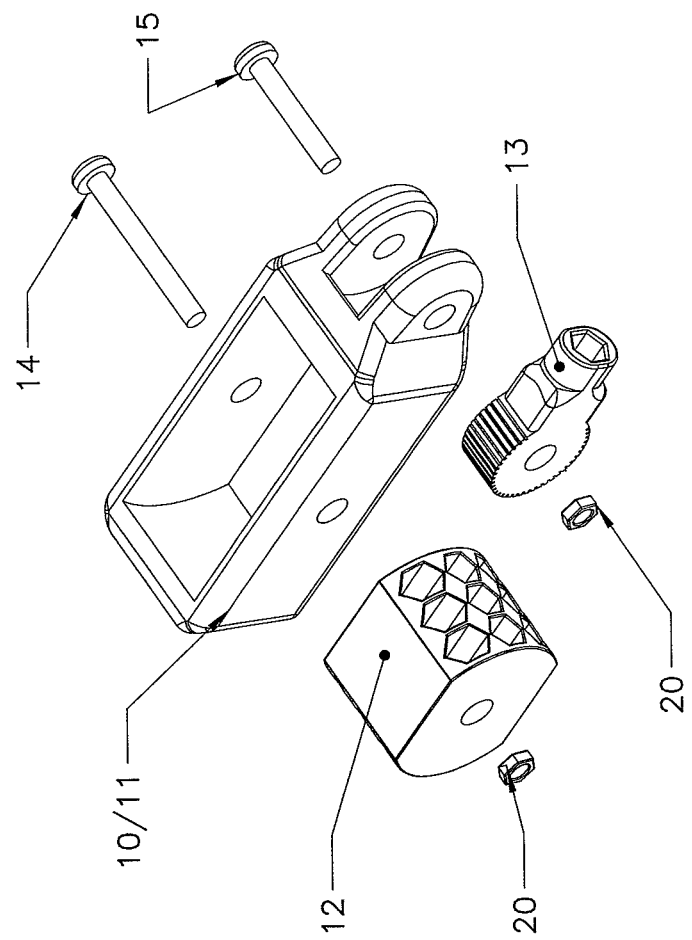

FIG. 5 depicts an exploded view of a hand toolkit instrument with a multi-chambered tool bit cartridge 12 and tool driver 13 but of a simple design including a one piece handle 10/11 with semi-secure positioning by applying friction between the handle 10/11 and tool bit cartridge 12 and the handle 10/11 and driver 13 by tightening fasteners 14, 15 and 20. All other positioning features as described in FIG. 3 and FIG. 4 are not included in this manifestation. Although any degree of complexity as described in FIG. 3 and FIG. 4 can conceivably be added to the hand toolkit instrument shown in FIG. 5.

Figure 6:
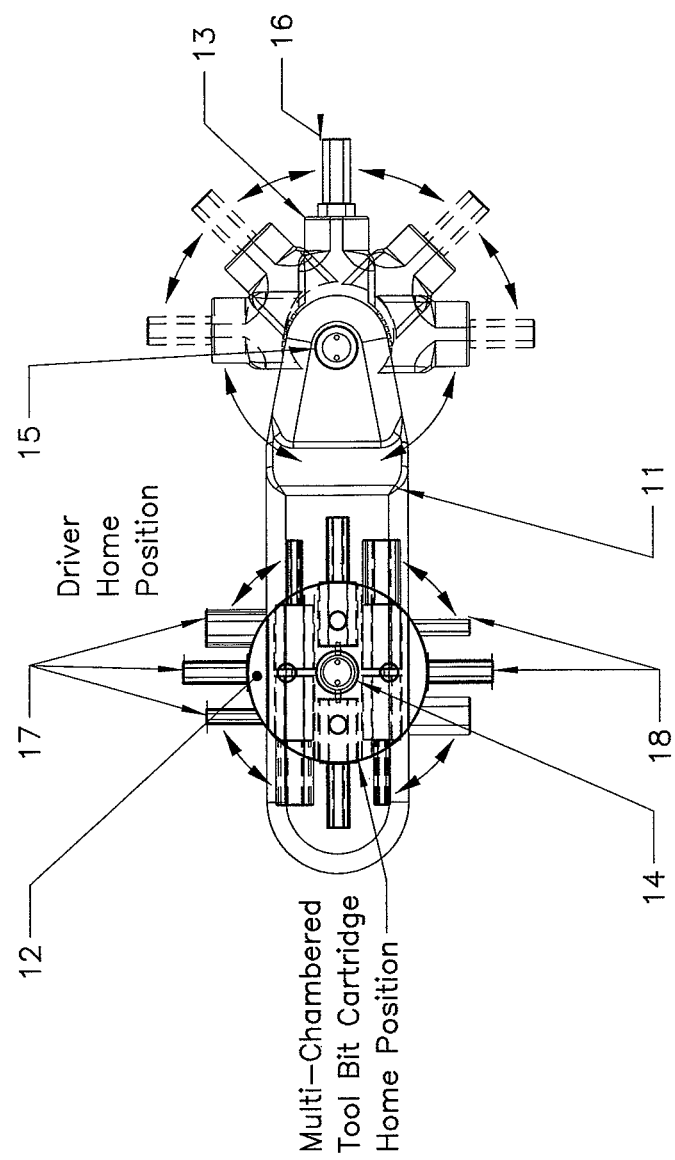
FIG. 6 This hand tool is similar in design to that shown in FIG. 1 displaying in phantom view example of multiple positions that the multi-chambered tool bit cartridge and tool bit driver can pivot.

FIG. 6 illustrates the hand toolkit instrument shown in FIG. 1 in phantom view and is one example of multiple positions that the multi-chambered tool bit cartridge 12 and tool bit driver 13 can pivot in relationship to the handle 11 in semi-secured or a locked positions.

Figure 7:
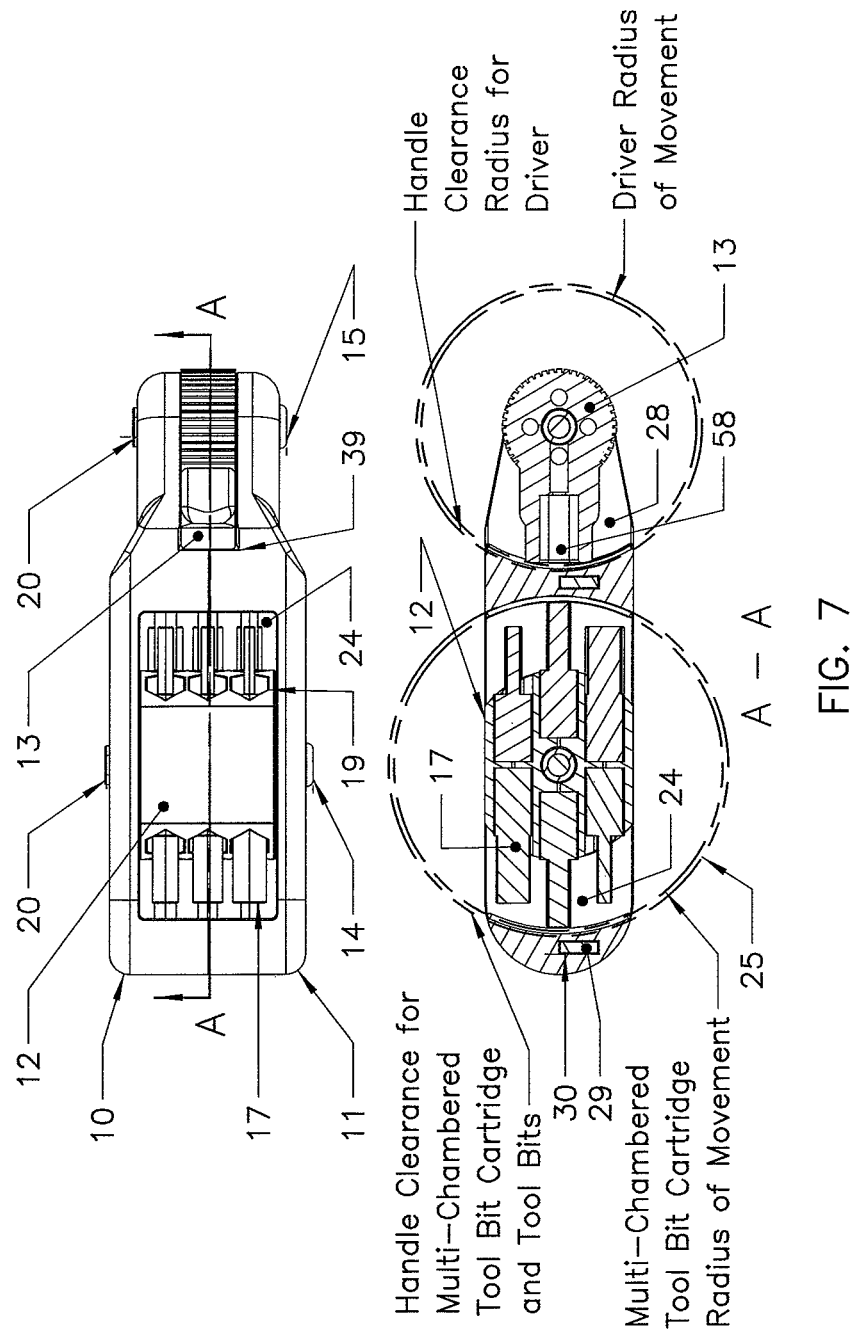
FIG. 7 A top view and sectional view of a hand tool component swing radiuses and similar in design to that shown in FIG. 2.

FIG. 7 is a top view and sectional view of a hand tool similar in design to that shown in FIG. 2 with the multi-chambered tool bit cartridge 12 and bit driver 13 in closed or home positions. The pivoting radius of both the multi-chambered tool bit cartridge 12 equipped with tools and tool bit driver 13 are shown as well as their respective handle clearance radius. The tool bit cartridge radius in relationship to the handle clearance radius 25 is important for retaining the tool bits in there chambers and prevents spillage should the hand tool instrument be dropped or jostled while the tool bit cartridge is in its closed and home location.

Figure 8:
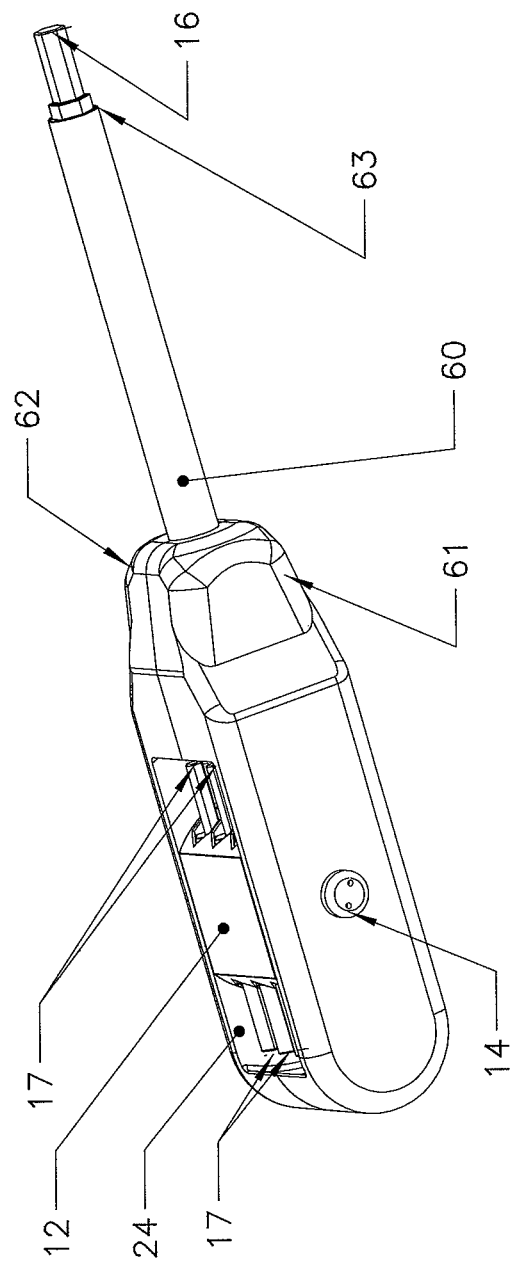
FIG. 8 Depicts a folding toolkit with a multi-chambered tool bit cartridge in a retracted and closed position and fixed (non-rotating) tool driver.

FIG. 8 further exemplifies the design flexibility of this invention displaying a folding toolkit with a multi-chambered tool bit cartridge 12 in a retracted and closed position and fixed (non-rotating) tool driver stem 60.

Figure 9:
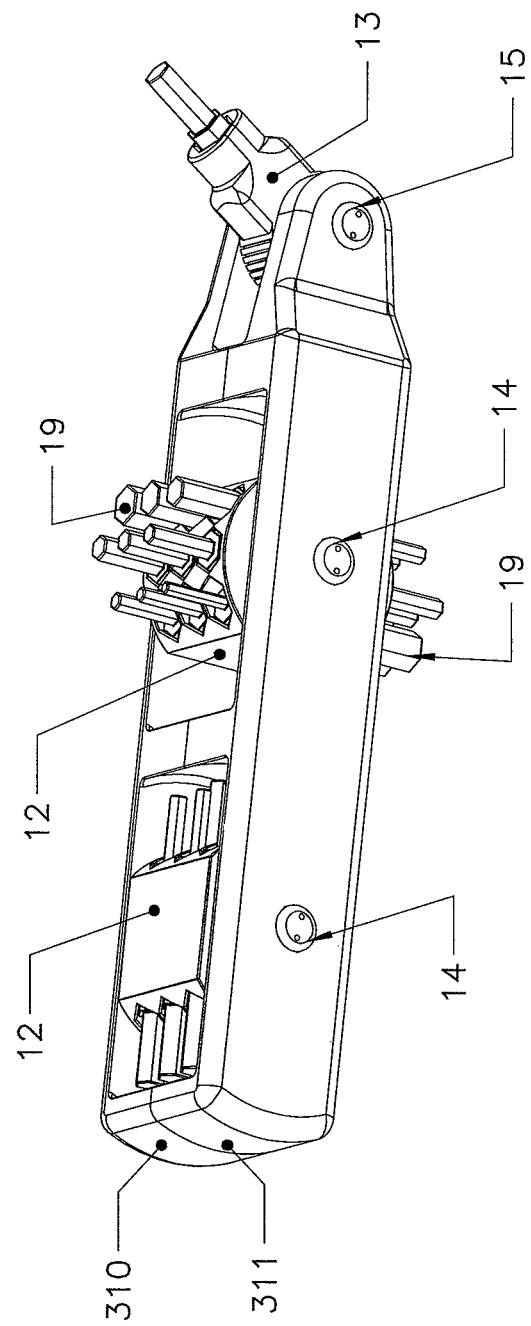
FIG. 9 Depicts a folding toolkit with more than one multi-chambered tool bit cartridge and one tool driver in various positions.

FIG. 9 illustrates with the use of similar design features as in FIG. 1 and demonstrates how the quantity of tool bits can be increased as well as contained and accessed with the use of additional multi-chambered tool bit cartridges 12 with within the handle sections 310 and 311.

FIG. 10 through 20 and FIG. 30 are examples of various multi-chambered tool bit cartridge designs and features. Although some of the examples differ in appearance they all exhibit the primary design parameters which are at the focal point of this invention which is the design of a hand tool system that will store and make accessible for selection and use the utmost quantity of fastener tools within the confines of the hand tool handle. This is accomplished by associating the common geometric consistencies that exist between each bit tool in a X, Y, Z matrix, providing access to the multi-chambered tool bit cartridge from more than one side in a radial or axial orientation either for purposes of accessing a particular tool bit or swing clearance of the tool bit cartridge. When required, aligning rows or columns associated with the X and Y axis on different plane levels (or differences in the mounted height of a tool bit) as associated with the Z axis. The examples shown here are a selection of multi-chambered tool bit cartridge designs and features, they are not an absolute accounting of all designs. Given the wide range of function and size of tool bits and sockets including such items as slotted, Phillips, hex, Torx, square and posi driver bits, nut drivers and sockets, drill bits and tap bits that can be accommodated in such a system it would be impractical to give examples of every design. Although the means for manufacturing and the material used for a given multi-chambered tool bit cartridge may vary, injection molding of a semi ridged elastomeric material may prove to be most effective.

Figure 10:
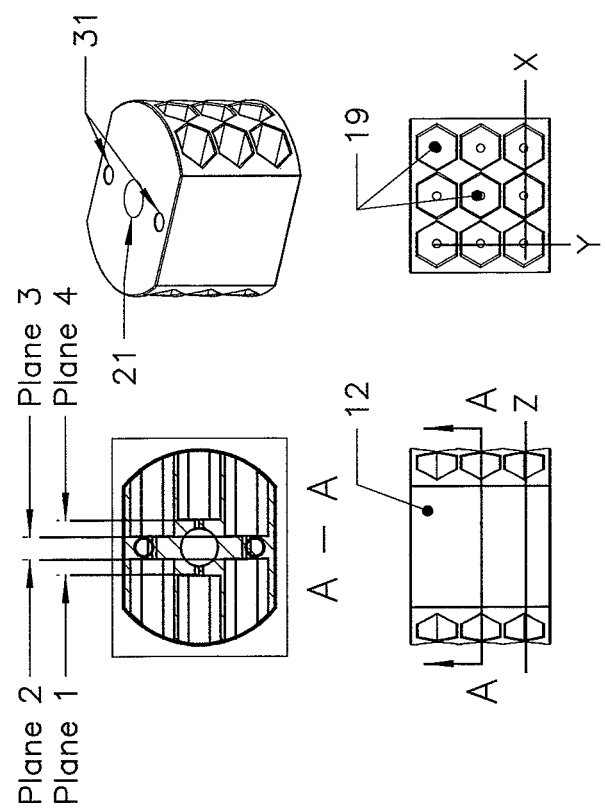
FIG. 10 Multiple views of a multi-chambered tool bit cartridge that allows for tool bits to be inserted from two sides of the cartridge.
Figure 11:
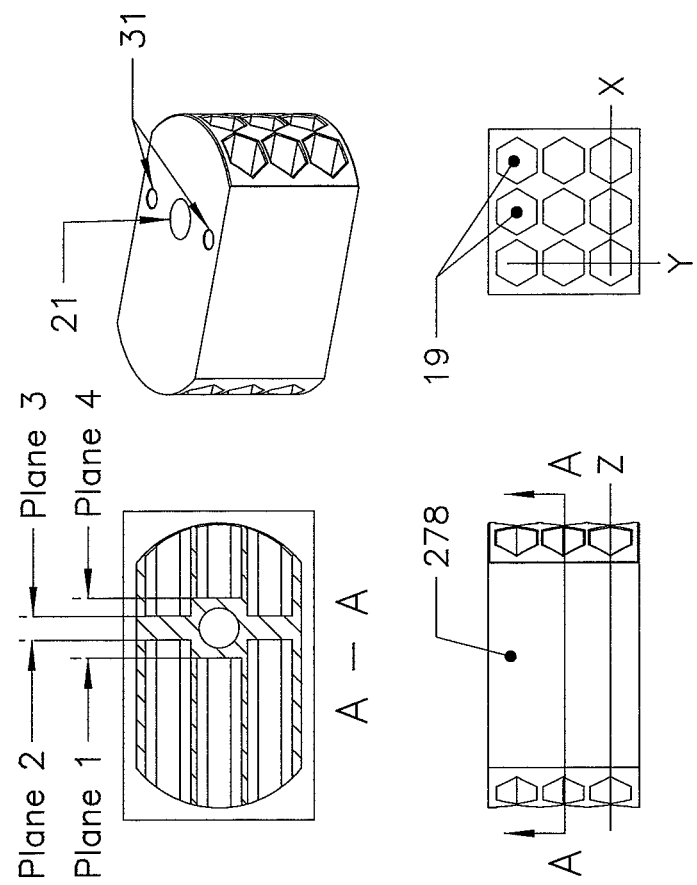
FIG. 11 Multiple views of a multi-chambered tool bit cartridge that allows for different size tool bits to be inserted from two sides of the cartridge. Also shown is an off-center axis of rotation.
Figure 12:
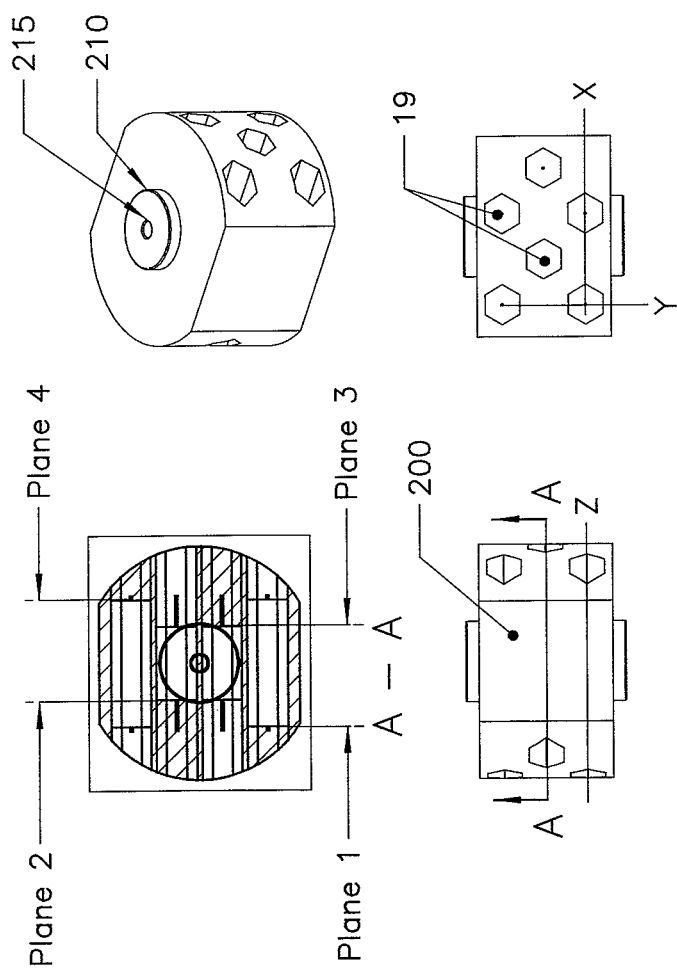
FIG. 12 Multiple views of a multi-chambered tool bit cartridge that allows for long tool bits to be inserted from two sides of the cartridge in a staggered arrangement.
Figure 13:
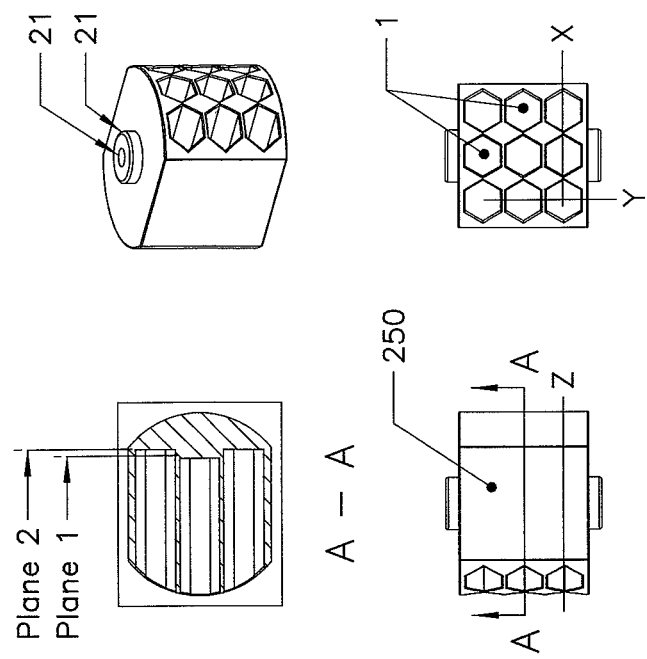
FIG. 13 Multiple views of a multi-chambered tool bit cartridge that allows for long tool bits to be inserted from one side of the cartridge as well as an external axis.
Figure 14:
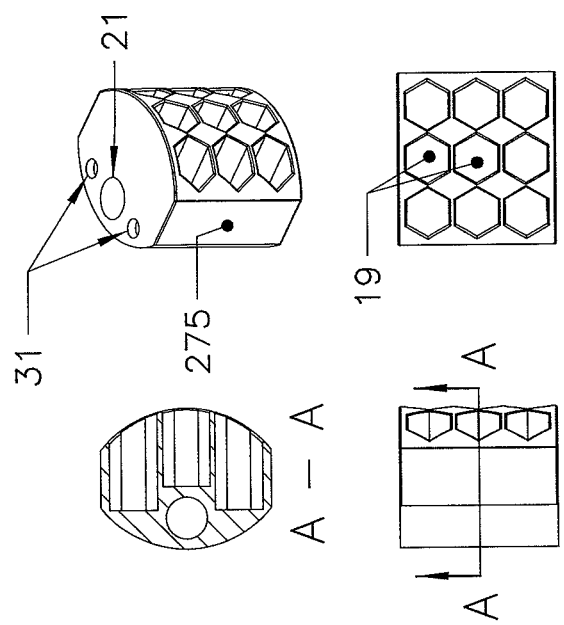
FIG. 14 Multiple views of a multi-chambered tool bit cartridge that allows for short tool bits to be inserted from one side of the cartridge. Also shown is an off-center axis of rotation.
Figure 15:
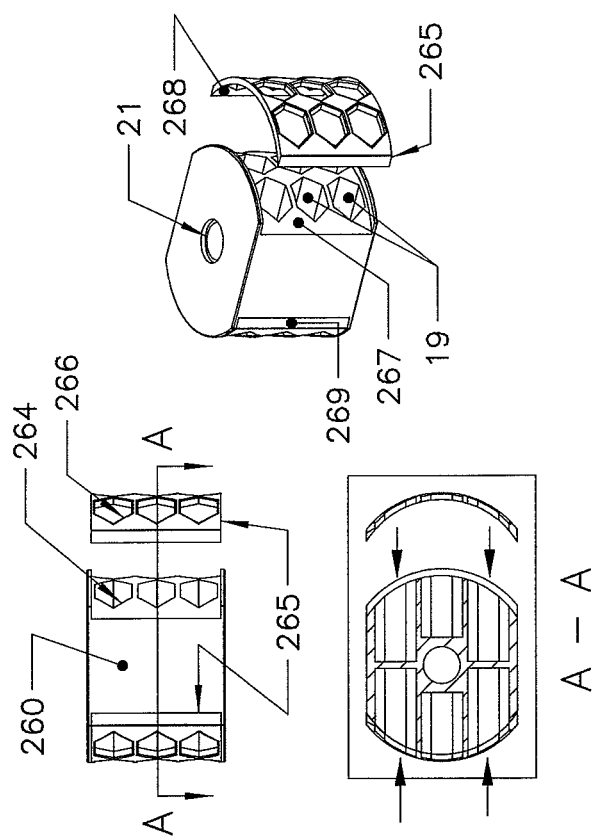
FIG. 15 Multiple views of a multi-chambered tool bit cartridge that allows for tool bits to be inserted from two sides of the cartridge and an elastomeric over-mold clad to each chambered face of the cartridge.
Figure 16:
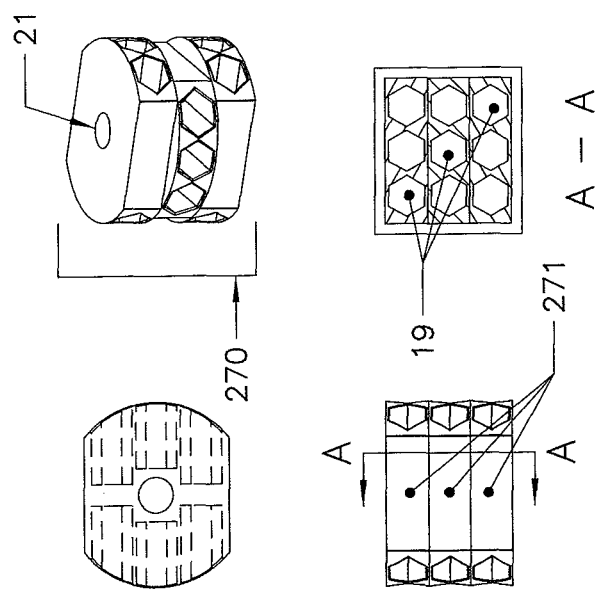
FIG. 16 Multiple views of several multi-chambered tool bit cartridge ganged together that allows for tool bits to be inserted from two sides of the cartridge.
Figure 17:
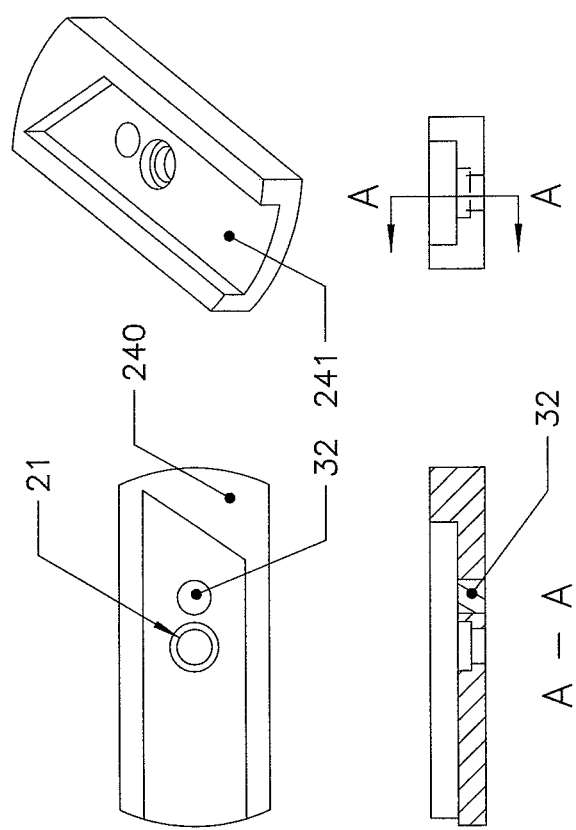
FIG. 17 Multiple views of a single-chambered side wall tool cartridge.
Figure 18:
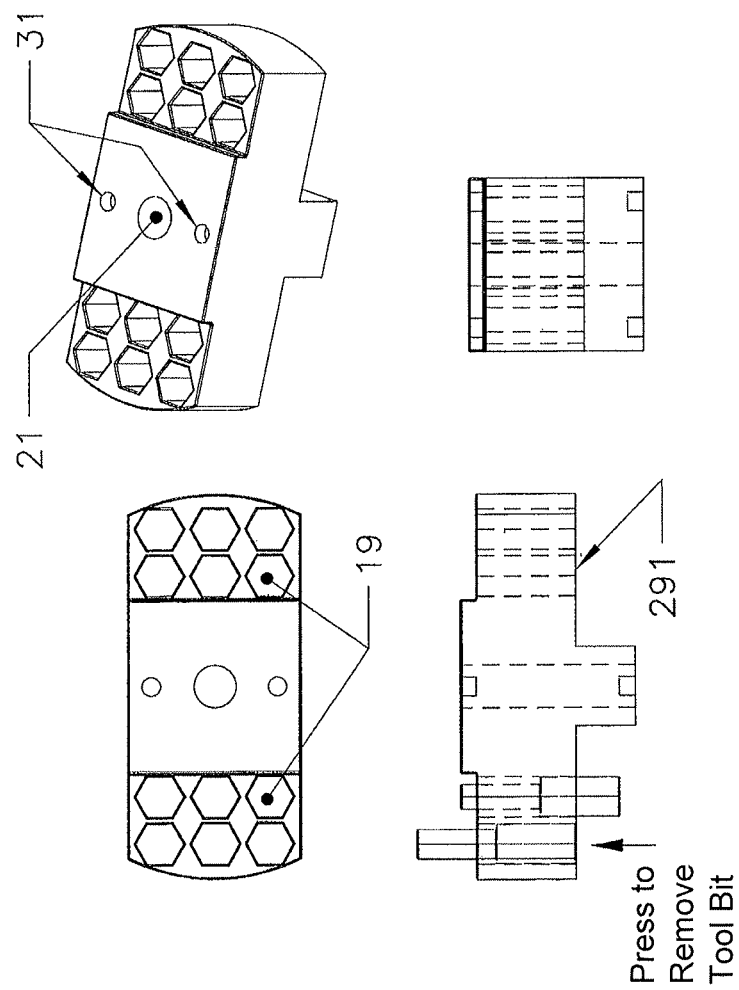
FIG. 18 Multiple views of multi-chambered tool bit cartridge with tool bit chambers perpendicular to the cartridge axis of rotation.
Figure 19:
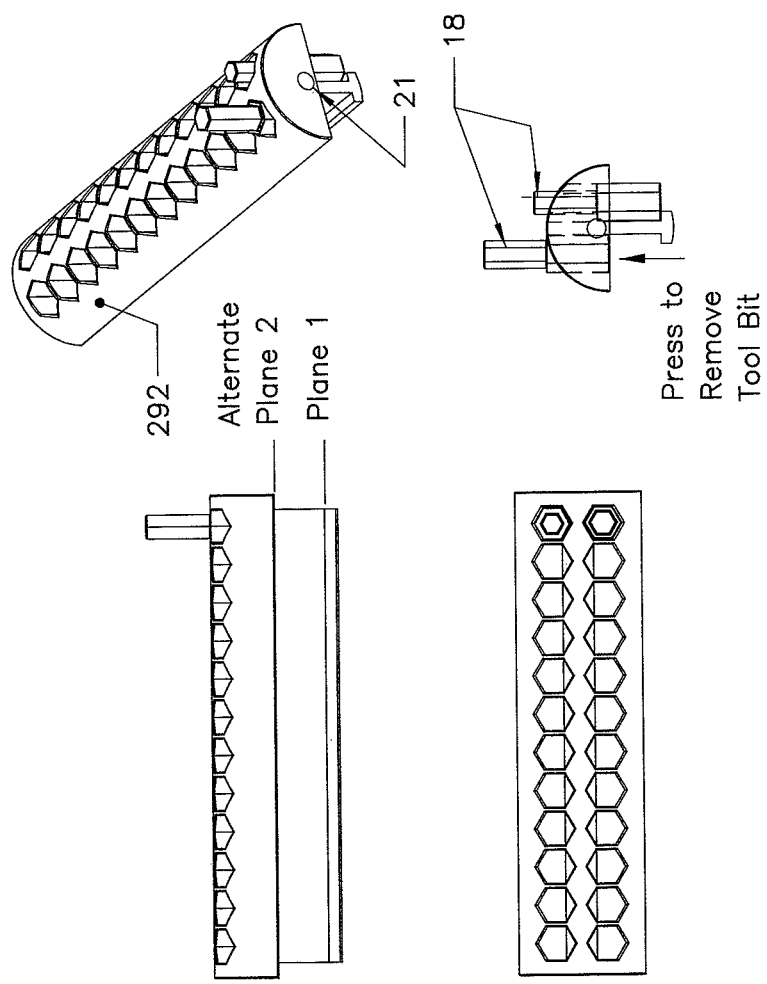
FIG. 19 Multiple views of multi-chambered tool bit cartridge that is parallel mounted in relation to the handle.

FIG. 10 displays a similar multi-chambered tool bit cartridge 12 as shown in FIG. 1 with features consistent with the intention of this invention including an X, Y and Z matrix, multiple planes and use of two sides of the tool bit cartridge. Feature 21 is a central pivot point and features 31 are components for a semi-secure positioning function. FIG. 11 differs from FIG. 10 demonstrating the ability to accept tool bits of different lengths using an offsetting pivot point 21. Illustrated in FIG. 12 is a feature to accommodate tool bits that are longer than the radius of the multi-chambered tool bit cartridge 200 in a staggered arrangement. To accomplish this axle bearing 210 protruding from each side wall of the tool bit cartridge and is designed to fit into and pivot in the handle of the hand toolkit instrument. This frees the core of the tool bit cartridge by not requiring a pivot point to protrude through the core of the tool bit cartridge. FIG. 13 is equipped with the same axel bearings 210 as shown in FIG. 12 and able to accommodate long tool bits but the tool bits are accessed from one side of the tool bit cartridge in a non-staggered matrix. FIG. 14 accommodates short tool bits from one side and features an offset pivot point 21. Shown in FIG. 15 is Item 265, an elastomeric overmold with an inside surface 268 that is clad to the outside surface of the multi-chambered tool bit cartridge 260. The purpose of this feature is to allow for a strong tool bit cartridge made from a hard material to be used while at the same time the elastomeric overmold 265 will grip the tool bit and hold it in place until selected. Additionally the tool bit access holes 266 in the elastomeric overmold 265 can be made slightly smaller than the access holes 264 located in the tool bit cartridge so as to apply additional gripping frictional force to the tool bit. Multiple views show in FIG. 16 are of several multi-chambered tool bit cartridges 271 ganged together along a common axis and that allows for a single cartridge or multiple tool bit cartridges to be selected. FIG. 17 is of a single-chambered tool bit cartridge for multiple tool bits 240. In this instance the tool bits are razor knife blades. In that there is standardization in size of razor knife blades and that they have a flat profile, they can be grouped in a single chamber 241. Transversely mounted in relation to the handle shown in FIG. 18 or parallel mounted in relation to the handle as shown in FIG. 19 tool bit chambers 19 of multi-chambered tool bit cartridge 290 and 292 can be situated closely together due to step feature 291 and 293 respectively.

Figure 20:
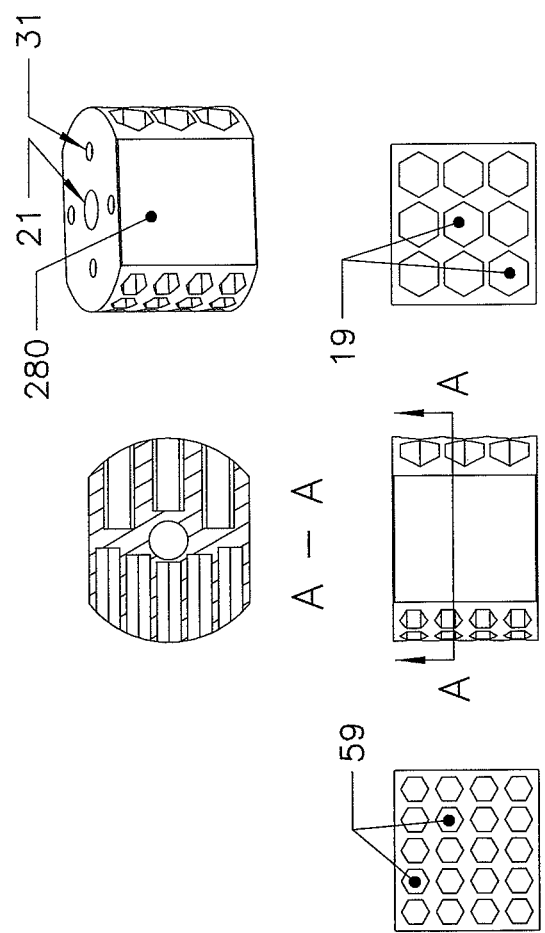
FIG. 20 Multiple views of a multi-chambered tool bit cartridge that allows for tool bits of different sizes to be inserted from each side of the cartridge.

Step feature 291 allows for a portion of the tool bit to hang in free space which forms the first plane while step feature 293 is also equipped with backstop feature 294. The backstop feature 294 allows for seating of a tool bit to a prescribed depth while still allowing for access to the aft end of the tool bit. To select a given tool bit that is shown mounted in either FIG. 18, FIG. 19 or FIG. 30 one would push on the back side of the aft end of the tool bit which in turn would slide it forward into an alternate plane that is aligned with feature 291 or 293 in relation to the remaining stored tool bits that maintain their position at the first plane and allow the tool bit that has been slid to the alternate or second plane to be gripped and removed from the tool bit cartridge. The multi-chambered tool bit cartridge 280 shown in FIG. 20 is similar to the tool bit cartridge shown in FIG. 10 with the except that one side of the tool bit cartridge is designed to accept tool bits that are larger in cross section 19 than the tool bits on the opposing side that are smaller in cross section 59. It becomes apparent that more than one size tool bit can fit into a single multi-chambered tool bit cartridge 280 however the first issue that this presents revolves around the size of the tool bit that the tool bit driver 13 can hold as shown in FIG. 1 which will only accept one size tool bit. The second issue revolves around accommodating a second tool bit driver in the same location and consuming the same space that is available for a single tool bit driver.

Figure 21:
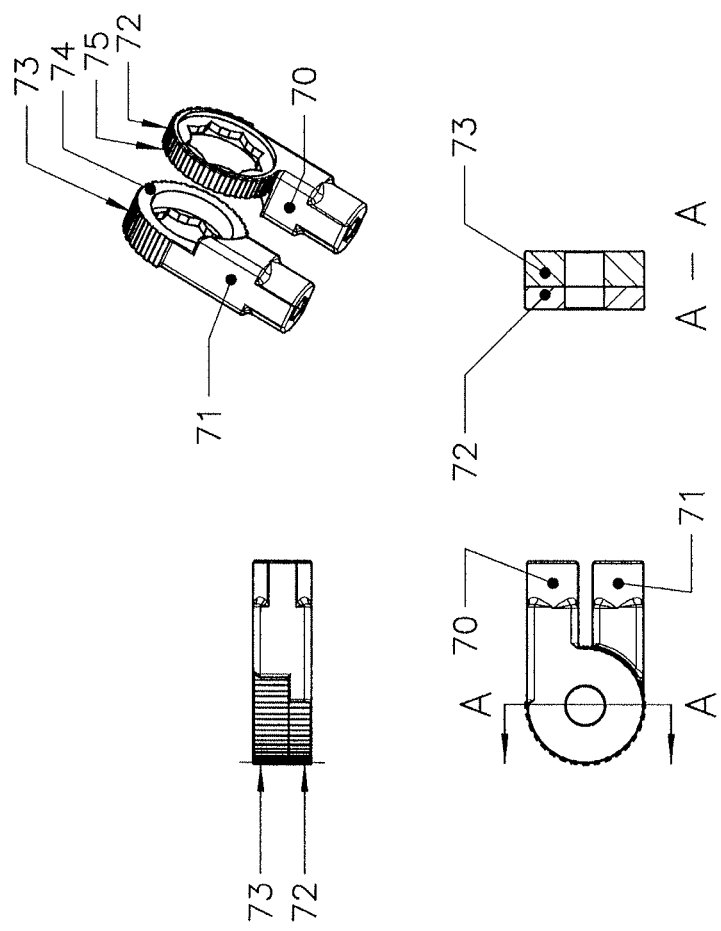
FIG. 21 Multiple views of split tool bit holders that function in conjunction with the multi-chambered tool bit cartridge shown in FIG. 20.

A solution can be found in FIG. 21; multiple views of split tool bit holders shown in FIG. 21 allow for two size tool bit holders 72 and 73 to accommodate the two different size tool bit cross sections 19 and 59. A set of split tool bit holders as shown in FIG. 21 can be designed in coordination with the multi-chambered tool bit cartridge shown in FIG. 20 where as two or more bit holders can consume the same width as a single bit holder with the strength that is required for the larger of the two bits to be emphasized with a greater cross sectional area at its aft end 73 than that of the smaller bit holder's cross sectional area at its aft end 72. In an adjacent and opposed arrangement for mating two dimensionally dissimilar tool bit holders made of similar materials while not exceeding the size of the larger tool bit holder and to obtain the optimal strength for each tool bit holder, an approximation can be calculated.

A1=larger extended tool bit cross sectional area
A2=smaller extended tool bit cross sectional area $$A1+(A1-A2)(A2)/A1 = \text{cross sectional area of the aft end for the larger tool 73}$$

$A1-(A1-A2)(A2)/A1$=cross sectional area of the aft end for the smaller tool 72

Figure 22:
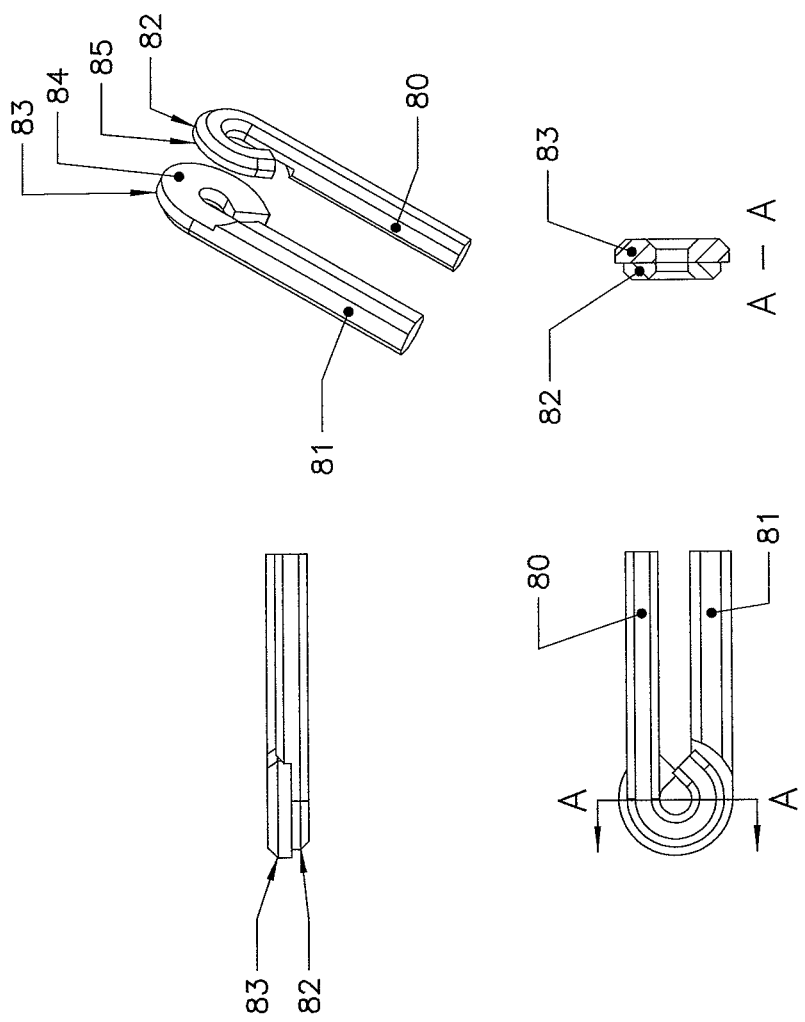
FIG. 22 Multiple views of extended tools in a similar arrangement to FIG. 21.

In this arrangement, the pivoting aft end of each tool bit driver 70 and 71 will align axially at the side face 74 and side face 75 while each of the working ends of tool bit drivers 70 and 71 consume the same cross sectional area as tool bit driver 13 shown in FIG. 1 except that they are offset by two times the height as well as any web clearance that may be required in the design of the tool handle and that depending on the orientation of the hand tool instrument, one of the tool bit drivers 70 and 71 will pivot clockwise and the other will pivot counter clockwise into position for use. For the same reason as described in the explanation of the solution outlined in FIG. 21, extended tools dissimilar in size and with lug aft ends as well as extended looped tools as shown in FIG. 22 where one extended tool might be of metric dimensions and the other fractional inch dimensions the same formula an approximation can be applied thusly as long as all dimensions are translated to the same units.

A1=larger extended tool shank cross sectional area
A2=smaller extended tool shank cross sectional area $A1+(A1-A2)(A2)/A1$=cross sectional area of the aft end for the larger tool 83

$A1-(A1-A2)(A2)/A1$=cross sectional area of the aft end for the smaller tool 82

The same would hold true when mating two extended looped tools made of similar materials but of dimensionally dissimilar sizes in an adjacent and opposed arrangement and aligned on a common shaft and that have uniformly circular geometries or regular polygons that are configured using an inscribed circle while not exceeding the size of the larger diametrical extended tool D1 when mated along surfaces 84 and 85 then, the dimensions for the diameter can be substituted for the cross sectional area and an approximation is calculated thusly.

D1=larger extended tool cross sectional area
D2=smaller extended tool cross sectional area
T=thickness of tool aft end $D1+(D1-D2)(D2)/D1=T1$ for the larger diameter tool 83

$D1-(D1-D2)(D2)/D1)=T2$ for the smaller tool 82

Figure 23:
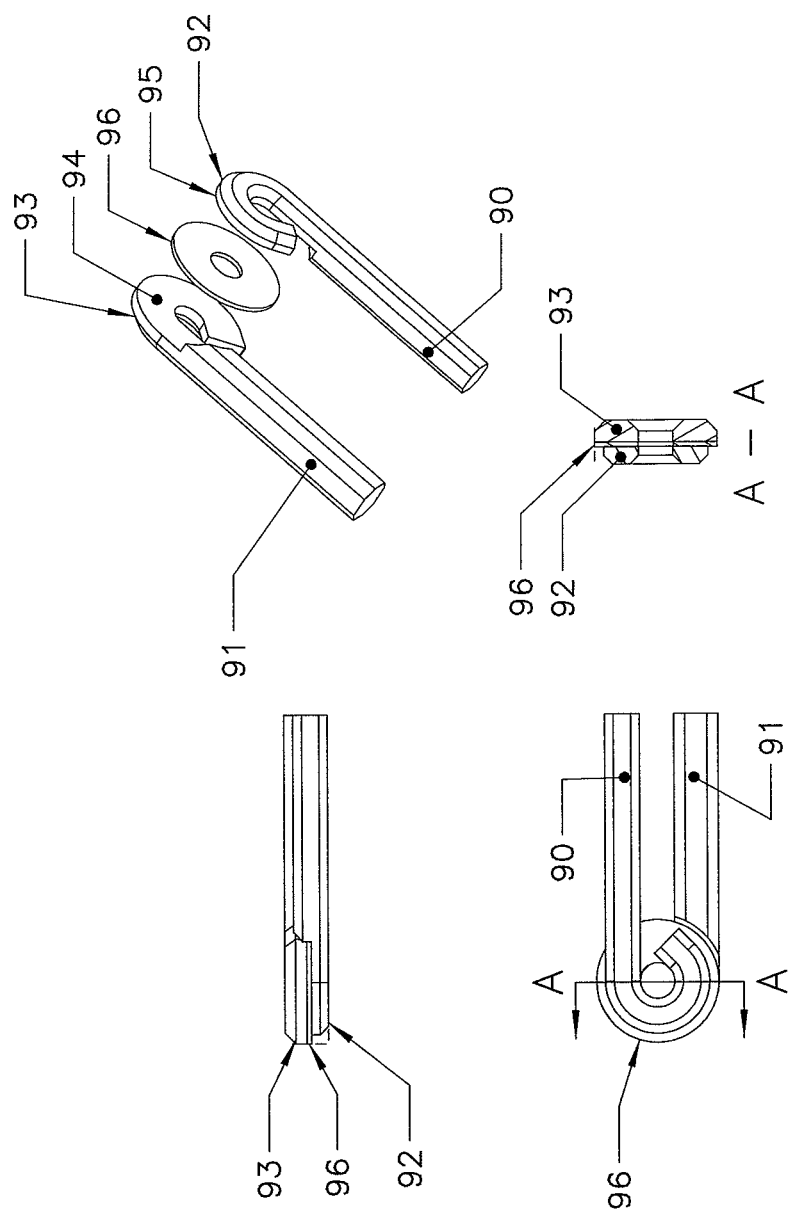
FIG. 23 Multiple views of extended tools with spacer in a similar arrangement to FIG. 21 and FIG. 22.

Multiple views of extended tools with spacer in a similar arrangement to FIG. 21 and FIG. 22 are shown in FIG. 23 that also shows spacer 96. Spacers either in a washer form or attached to the handle are often used for strength, alignment and to reduce friction between the mating surfaces, in this instance surfaces 94 and 95. Optimizing the strength of each diametrical extended tool aft end can be a significant a design factor when two extended tools aft ends are occupying the same thickness as the thickness of the shank of the larger extended tool. A spacer can be used with accommodations for the geometrical differences between the two tools by proportionally subtracting the thickness of the spacer from each extended tool aft end while using the above formulas or the thickness of a spacer (S) an approximation can easily be calculated in a more simple form.

R1=larger extended tool radius 93
R2=smaller extended tool radius 92
S=thickness of a spacer if it is to be used 96

$R1-R2=S$ (thickness of the spacer)

This would therefore allow extended tool with either lug or looped aft ends to conform to the object of this invention. Till now, extended hex toolkits that are mounted in descending order according to size and pivot on a shaft from a home position of a common handle in metric sizes are supplied as a separate toolkit than toolkits of fractional inch (SAE) size of a similar arrangement. By using the above formula and as an example, arranging the metric extended tools on one of the open sides of the handle and the SAE size extended tools on the opposing open side of the handle it is now possible to provide a single hand toolkit instrument that includes two full sets of tools, one being metric extended tools in a descending order and the other being SAE extended tools in an accompanying descending order. One set will pivot clockwise and the other will pivot counter clockwise into position for use.

Figure 24:
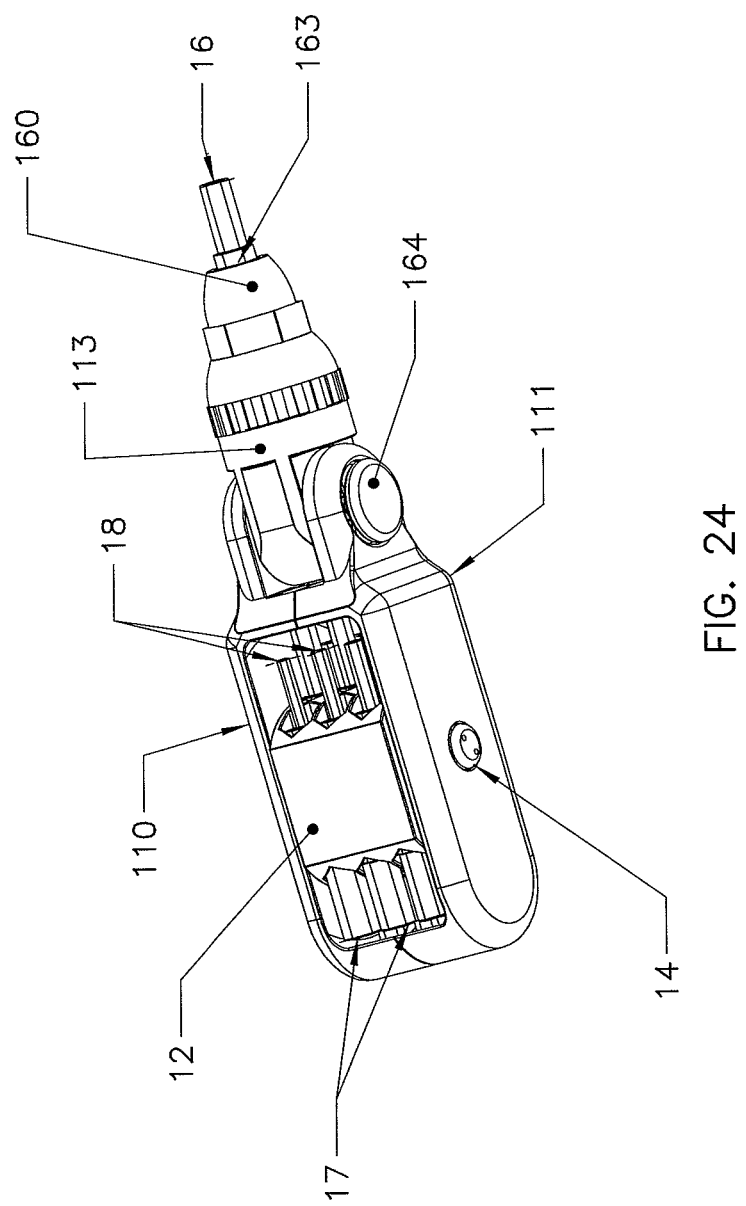
FIG. 24 Depicts a folding toolkit with a multi-chambered tool bit cartridge in a retracted and closed position and with a ratchet bit driver.

FIG. 24 is an isometric view of a hand toolkit instrument which embodies a positional multi-chambered tool bit cartridge 12 in its closed position for tool bit storage and a positional ratchet tool bit driver 160 in an open position for use contained within and in relation to the handle sections 110 and 111. Although a ratchet tool bit driver is shown other tool driver such as socket tool drivers chuck drivers or collet drivers could also be employed. The handle sections 110 and 110 are shown to be held together with fastener components 14. An assortment of tool bits 17 and 18 are arranged on two ends of the multi-chambered tool bit cartridge 12 and maintained in a closed and stored position. A tool bit 16 has been selected and inserted into a mating chamber 163 located in ratchet tool bit driver 160 for use. Push button 164 is located on the side of handle section 111 and interconnects with the ratchet driver holder 113.

Figure 25:
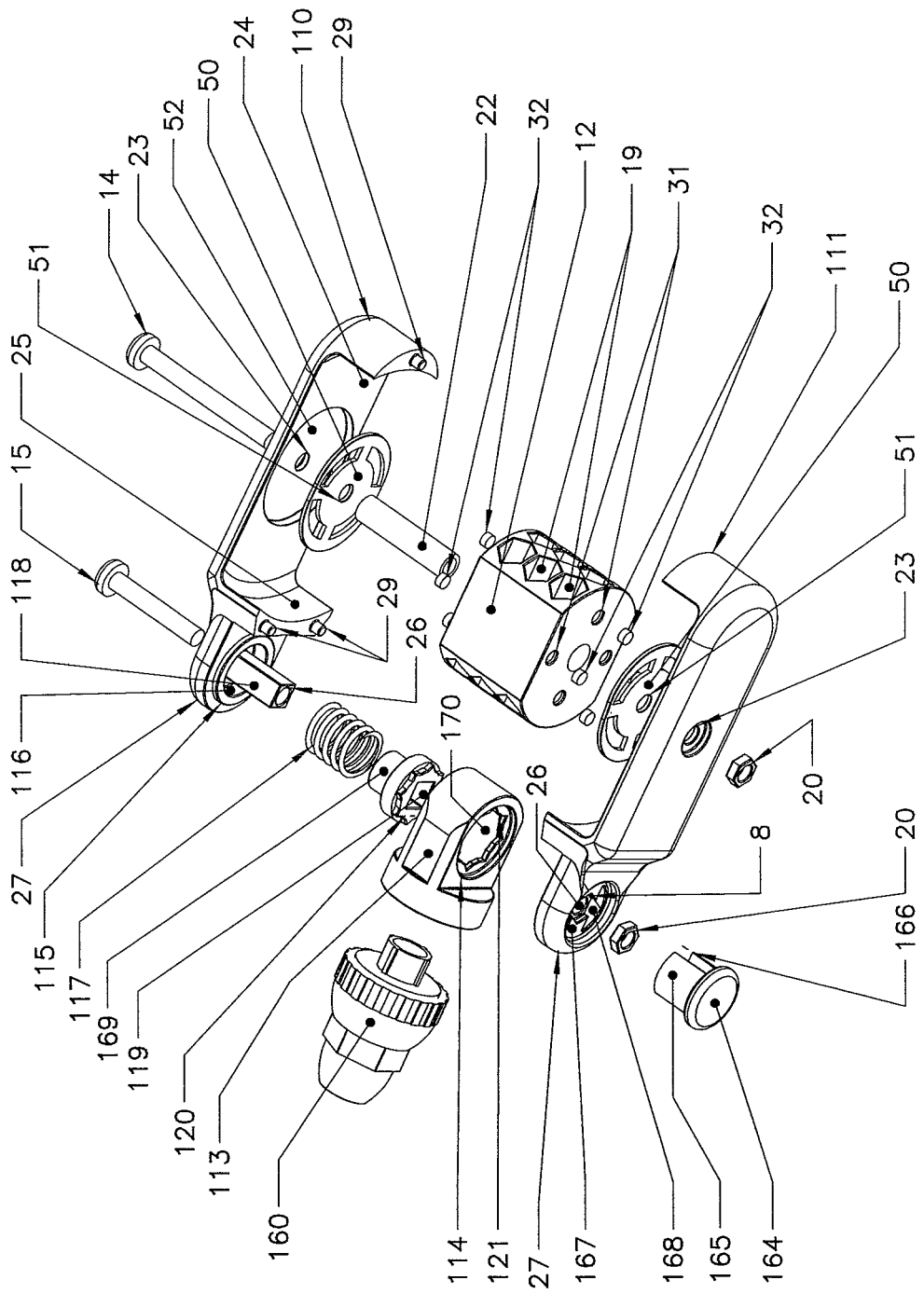
FIG. 25 This exploded view shows the same toolkit as in FIG. 24 and is equipped with a multi-chambered tool bit cartridge and ratcheting bit driver with a positive locking mechanism along with a split handle.

FIG. 25 is an exploded isometric view that illustrates assembly and positioning features of the present invention more clearly. The multi-chambered tool bit cartridge 12 revolves around axle sleeve 22 shown here to be a separate component located between handle sections 110 and 111. In this view axle sleeve 22 has the functions of being the pivot point for the multi-chambered tool bit cartridge 12, provide a pathway 23 and 51 to connect fastener components 14 and 20 to hold the handle sections 110 and 111 together and to perform the function of being a spacer that will prevent handle sections 110 and 111 from being compressed and thus rub against the multi-chambered tool bit cartridge 12 and restrict free rotation of the tool bit cartridge. Additionally axle 22 assist in transferring torsion forces when applied during use more uniformly between both halves of the handle sections 110 and 111. A small clearance gap between the inner walls 24 of handle section 110 and 111 should be maintained to allow free rotation and effective positioning of the multi-chambered tool bit cartridge 12. Located in the side walls of the multi-chambered tool bit cartridge 12 are hole provisions 31 that accommodate plugs 32. On the inside walls of handle sections 110 and 111 are recessed mounting provisions designed to cradle the ferromagnetic positioning plates 50. The same relationship as described in the descriptions for FIG. 3 and FIG. 4 regarding magnetic and ferromagnetic materials used for the purpose of positioning apply to FIG. 25 in regards to semi-secure positioning of the multi-chambered tool bit cartridge 12. Ratchet assembly 160 is fitted into ratchet holder 113 which also has a second function as a component to a positive engagement multiple position locking mechanism.

The positive engagement multiple position locking mechanism shown in FIG. 25 is a unique device that is incorporated into and contained within the handle sections 110 and 111. Located in handle section 111 is a bridge 167. The bridge has one or more hole provisions 168 that allow the stem 165 of push button 164 to transverse through the hole provision 168 allowing the gap 166 to span the bridge 167 and form a second bridge that is the face of the push button. Bridge 167 can also provide a seat 8 for fastener 20. This allows fastener 15 to pass through handle section 110 using clearance hole 26 which passes through handle sections 110 and 111 and the components that make up the positive engagement multiple position locking mechanism and mate with fastener 20 that is situated between bridge 167 and the second push button bridge of push button component 164, The ability to accommodate fasteners 15 and 20 and connecting the wing or ear sections 27 of handles 110 and 111 add significant strength to the driver portion of the hand toolkit instrument. Linear slide 118 is shown to be attached to handle section 110. Linier slide 118 is slightly smaller in dimensions than the linier lock 169. The geometry of the core 119 of linier lock 169 and the geometry of the external face of the linear slide 118 are such that the linear lock can slide back and forth in one direction along the linear slide but is prevented from rotating about the linear slide thus maintaining the same angular cohesion with the handle sections at all times. The linear slide 118 performs a second function of being a spacer that will prevent the wing or ear sections 27 handle sections 110 and 111 from being compressed and thus rub against the ratchet driver holder 113 and restrict rotation of the ratchet driver holder and allow for the smooth motion of the linear lock 169 along the linear slide 118. Additionally linear slide 118 assists in transferring torsion forces when they are applied during use more uniformly between both of the wing or ear sections 27 of the handle sections 110 and 111. The linear lock 169 is equipped uniformly spaced integrating spline 120. The ratchet driver holder 113 is equipped with a corresponding geometry of uniformly spaced gaps 121. When the hand toolkit instrument is assembled a bias compression spring 117 is fitted into a seat 116 and surrounds the linear slide 118 and a portion of linear lock 169 with one end of the bias compression spring 117 against handle section 110 and the other end against a face of linear lock 169. The opposite end to that of the spring side of the linear lock 169 mates with stem 165 of push button 164 allowing a uniformly spaced integrating spline 120 of the linear lock 169 to integrate with the corresponding geometry of uniformly spaced gaps 121 of the ratchet driver holder 113; fastener 15 is connected with fastener 20 and hold the assembly together. A simulation of this assembly his is shown in the sectional view of FIG. 28 and FIG. 29.

Figure 26:
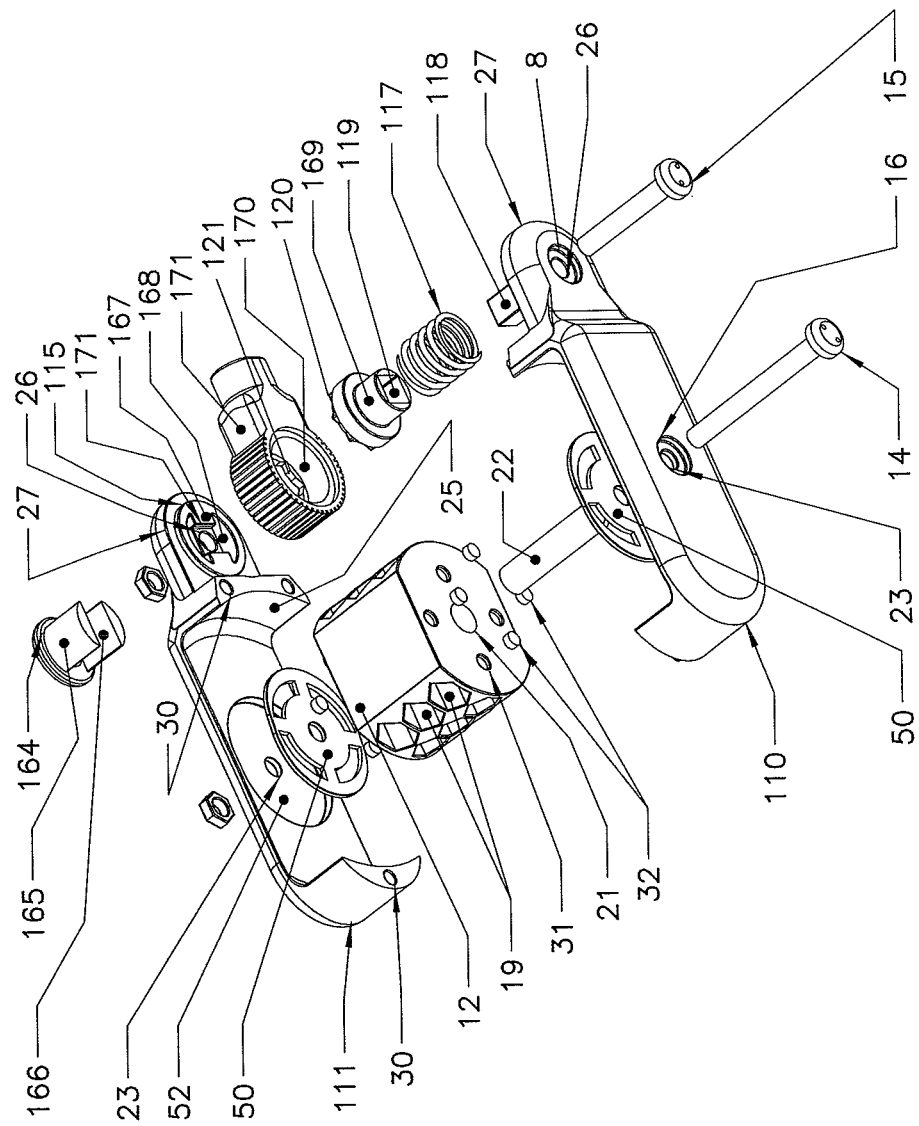
FIG. 26 An exploded view shows the same toolkit as in FIG. 24 and FIG. 25 but with a non-ratcheting bit driver.

FIG. 26 is an exploded isometric view similar to FIG. 25 and that illustrates assembly and positioning features from a different perspective. The difference in description between FIG. 25 and FIG. 26 is that tool bit holder 171 is substituted in FIG. 26 for ratchet assembly 160 and ratchet holder 113 shown in FIG. 25.

Figure 27:
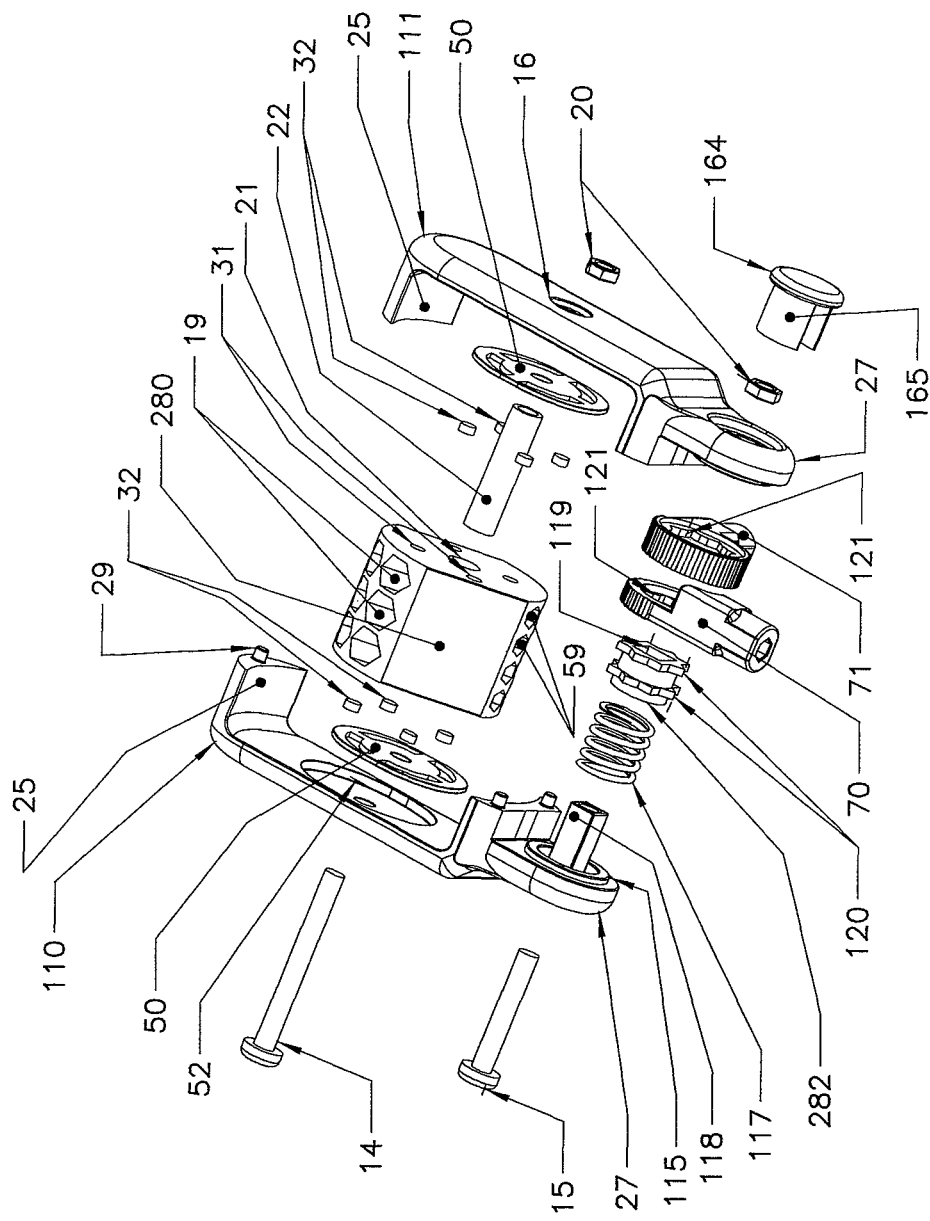
FIG. 27 A similar exploded view to FIG. 26 with similar features except there are two bit drivers as shown in FIG. 21, one each to accommodate two different size tool bits that would fit in the multi-chambered tool bit cartridge shown in FIG. 20.

FIG. 27 is an exploded isometric view similar to FIG. 25 and FIG. 26 and illustrates assembly and positioning features from a different perspective. The difference in description between FIG. 26 and FIG. 27 is that tool bit drivers similar to 70 and 71 that are shown in FIG. 21 have been substituted for the tool bit driver 171 shown in FIG. 26, the multi-chambered tool bit cartridge 12 shown in FIG. 25 and FIG. 26 have been replaced by the multi-chambered tool bit cartridge 280 shown in FIG. 20 and the linear lock 169 has been interchanged with a linear lock 282 that features dual rows of uniformly spaced integrating splines 120. Each row is designed to integrate with the corresponding geometry of uniformly spaced gaps 121 of the tool bit drivers 70 and 71.

Figure 28:
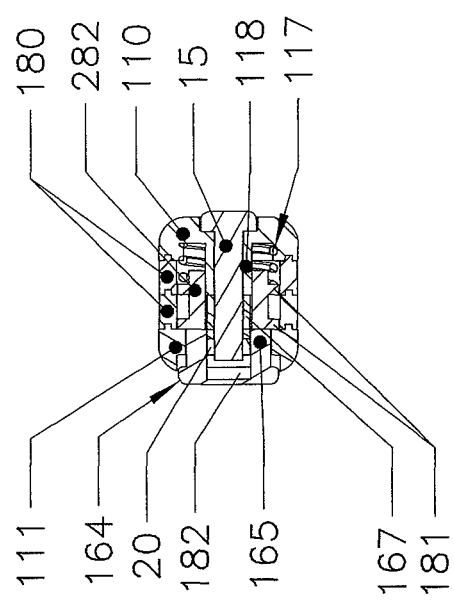
FIG. 28 A sectional view of the positive locking mechanism with two bit holders in a locked position.

FIG. 28 is a sectional view of a positive engagement multiple position locking mechanism in its locked state. The bias spring 117 is pushing away from the handle 110 and against the linear lock 282. The linear lock 282 in turn is forced along the linear slide 118 and to integrate its uniformly spaced spline 120 with the uniformly spaced gaps 121 of drivers 180 at the locations identified as 181. Additionally the linear lock is pushing against the push button stem 165 of push button 164 extending the pushbutton stem through hole provisions 168 that is formed by the bridge 167 and to an outward position increasing the displacement space 182 which is formed above the bridge 167 located in handle section 111 and below the bridge that is formed by the pushbutton stem 165. The handle sections are held together by fastener 15 that extends through the core of the linear slide 118 and other components of the locking mechanism as well as the bridge 167 to fastener 20. This view of the positive engagement multiple position locking mechanism demonstrates a positive engagement system using two drivers 180 however the basic concept can be designed to work with one driver or many drivers as be used to provide a multi-chambered tool bit cartridge as well as other tool devices with a positive engagement multiple position locking mechanism.

Figure 29:
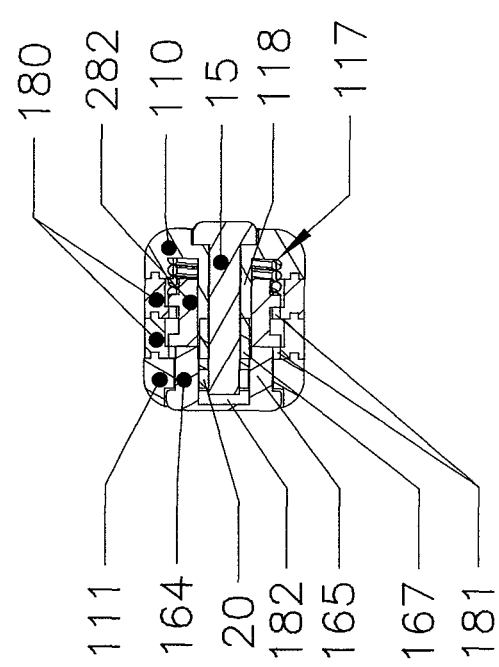
FIG. 29 A sectional view of the positive locking mechanism with two bit holders in a unlocked position.

FIG. 29 is a sectional view of the same positive engagement multiple position locking mechanism as shown in FIG. 28 in its unlocked state. Push button 164 is being forced inward by an operator who applies a force greater than the spring 117 force reducing the displacement space 182 by the stroke length of the push button displacement. The stroke of displacement is less than the width of a single driver or the width of the narrowest driver if more than one driver is being used. The push button stem 165 is transposed through the hole provisions 168 created by the bridge 167 and pushing against and displacing the uniformly spaced spline 120 of the linear lock 169 along the linear slide 118 and away from the uniformly spaced gaps 121 of drivers 180 at the location identified as 181 creating a non-engagement condition between the linear lock 169 and drivers 180. This allows the drivers 180 to be rotated into a desired position. Releasing the force that is applied to the push button 169 allows the spring 117 to expand returning the linear lock 282 along the linear slide 118 and push button 164 to its normal state as shown in FIG. 28 and locking the drivers 180 in their new position.

Figure 30:
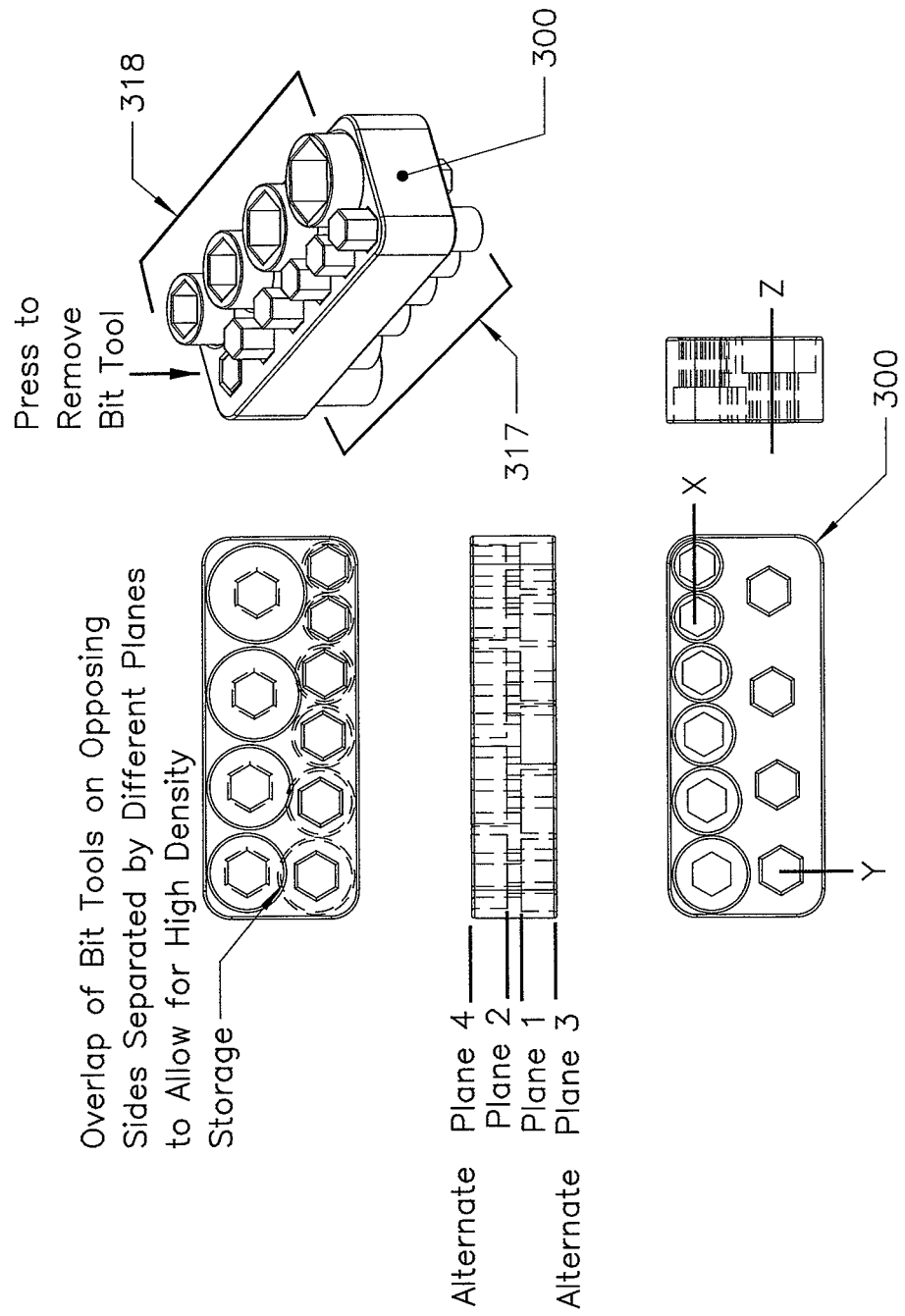
FIG. 30 Multiple views of a non-positional multi-chambered tool bit cartridge that allows for storing tool bits in a cartridge that has a radius to great to rotate.

The multi-chambered tool bit cartridge 300 as shown in FIG. 30 is a non-rotating design. Its features are consistent with the intention of this invention including an X, Y and Z matrix, multiple planes, use of two sides of the tool bit cartridge and that can be stored in an organized fashion within the confines of a standard size tool handle, the combination of the large size and quantity of a full set of socket type tool bits positioned in a multi-chambered tool bit cartridge combined with the turn radius of the subassembly could only be accommodated within a handle that is greater than what would be considered a standard size tool handle is the reason why the design of the multi-chambered tool bit cartridge is a non-rotating design. In a similar fashion to the tool bits shown mounted in either FIG. 18 or FIG, 19 removal is promoted by pushing against the aft end of the tool bit which in turn would slide it forward into an alternate plane in relation to the remaining stored tool bits that maintain their position and allow the tool bit that has been slid to the alternate plane to be gripped and removed from the tool bit cartridge.

Figure 31:
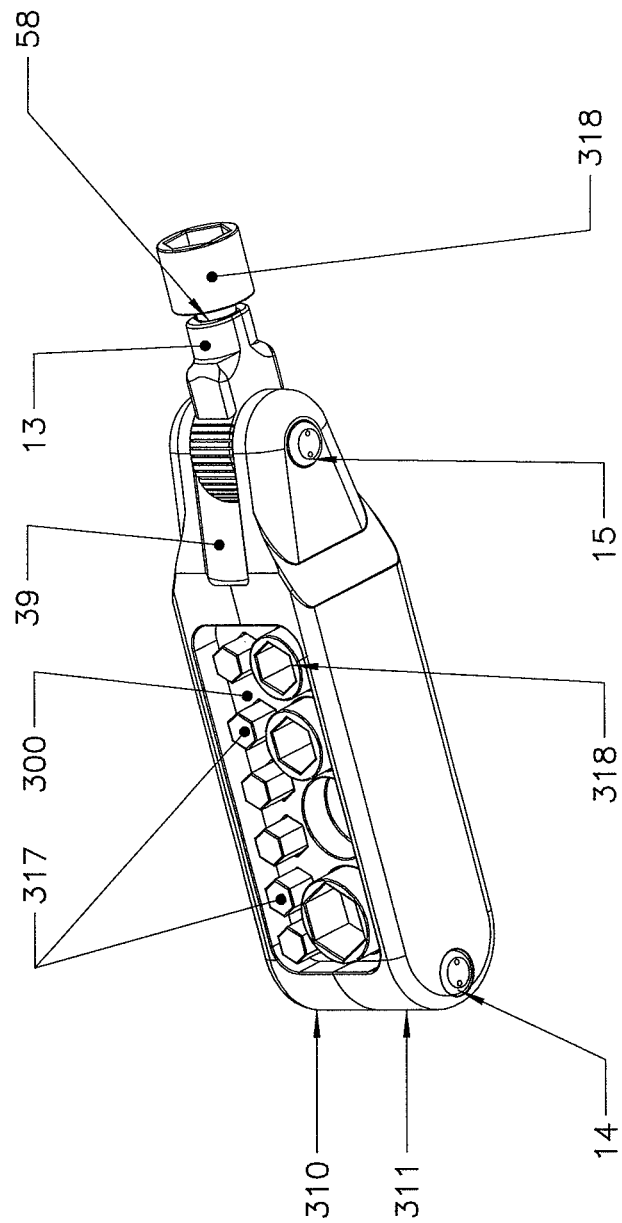
FIG. 31 Depicts a folding toolkit multi-chambered tool bit cartridge as shown in FIG. 30 and tool driver in an extended and open position.

FIG. 31 is an isometric view similar to FIG. 1 of a hand toolkit instrument which embodies a non-positional multi-chambered tool bit cartridge 300 the tool bits and tool bit cartridge do not exceed the dimensions of the open handle and are accessible from two sides for tool bit selection. The positional tool bit driver 13 in an open position for use. The handle sections 310 and 311 are shown to be held together with fastener components 14 and 15 although other means of joining the handle sections such as sonic welding or rivets could be employed. In some instances the handle could be a single component rather than two halves. An assortment of tool bits 317 and 318 are arranged on each side of the multi-chambered tool bit cartridge 300 and fully exposed for selection. A tool bit 318 has been selected and inserted into a mating chamber 58 located in tool bit driver 13 for use.

Figure 32:
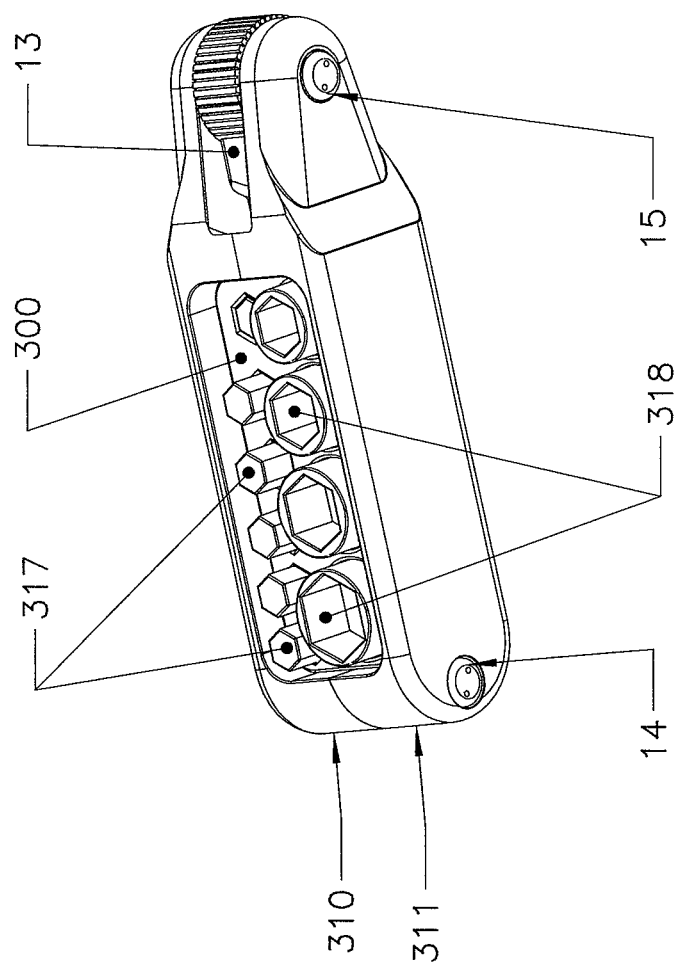
FIG. 32 Depicts a folding toolkit multi-chambered tool bit cartridge as shown in FIG. 30 and tool driver in a retracted and closed position.

FIG. 32 is the same hand toolkit instrument as in FIG. 31, an isometric view which embodies a non-positional multi-chambered tool bit cartridge 300. The tool bit driver 13 in a closed or home position and contained within the handle sections 310 and 311.

Figure 33:
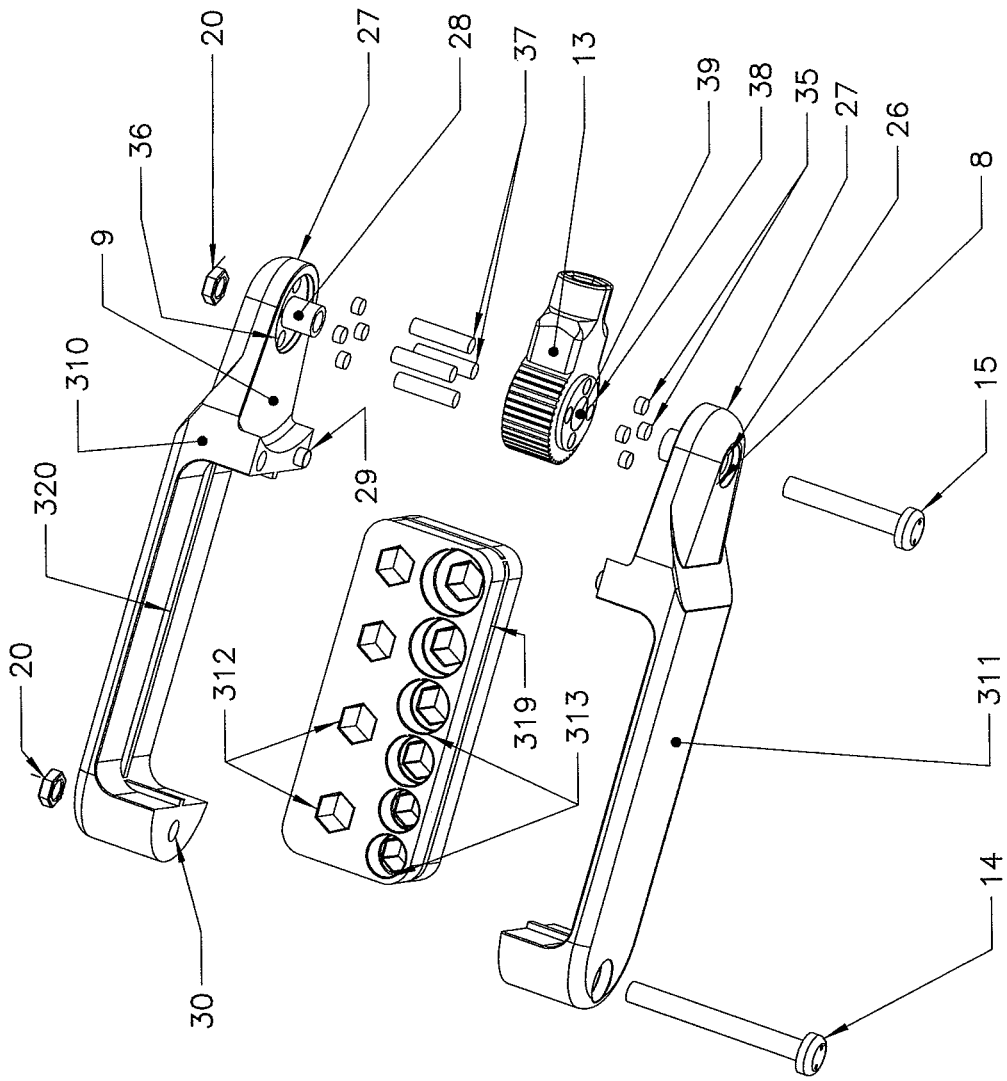
FIG. 33 An exploded view shows this hand tool is equipped with a multi-chambered tool bit cartridge as shown in FIGS. 30 and 31 and bit driver along with a split handle.

FIG. 33 is an exploded isometric view that illustrates assembly and positioning features of the present invention more clearly. The multi-chambered tool bit cartridge 300 is of a non-positional design. Slotted provision 319 located in the side walls of the tool but cartridge is shown to engage with tab provision 320 located in the handle 310 and 311 inside wall sections is an example of securing the tool bit cartridge in place. Similar to FIG. 3 plugs 35 are situated in hole provisions 36 of the inside wall 9 of handle sections 310 and 311 and plugs 37 located in hole provisions 38 of the tool bit driver 13. Additionally, the tool bit driver 13 revolves around axle 28 shown here to be in two sections and attached to handle sections 310 and 311 although other manifestations of axle 28 can produce its primary functions. In this view axle 28 has the functions of being the pivot point 39 for the tool bit driver 13, provide a pathway 26 to connect fastener components 15 and 20 and to perform the function of being a spacer that will prevent handle sections 310 and 311 from being compressed and thus rub against the tool bit driver 13 and restrict free rotation of the tool bit driver. A small clearance gap between the inner walls 9 of handle section 310 and 311 should be maintained to allow free rotation and effective positioning. Stem feature 29 along with the mating hole feature 30 with one or more locations on handle sections 310 and 311 add additional strength to the hand toolkit instrument especially when significant torque is applied to the tool bit driver.

Figure 34:
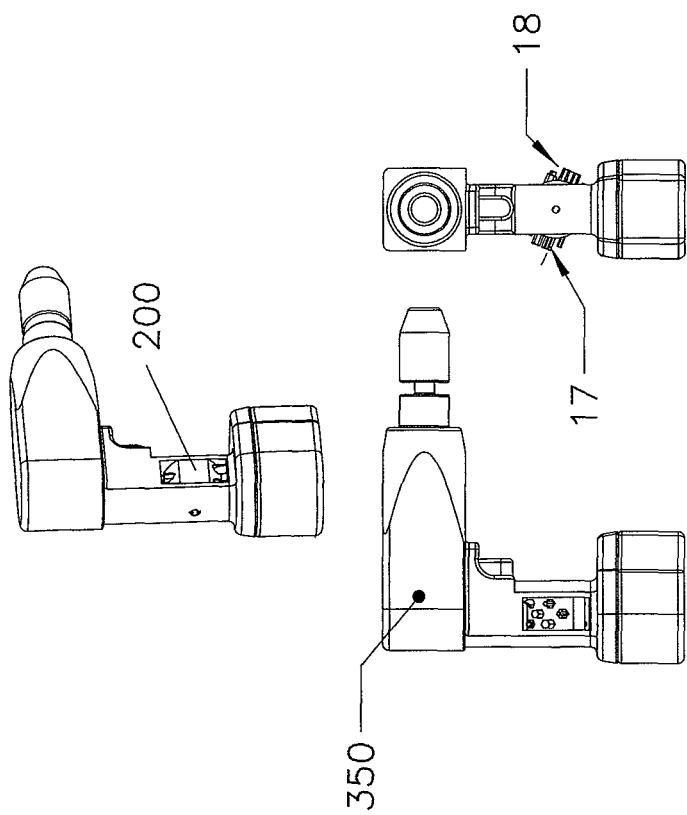
FIG. 34 Depicts a multi-chambered tool bit cartridge located in the handle of a power hand tool and shown in several positions.

Another application of this invention is illustrated in the views shown in FIG. 34 that demonstrates how a multi-chambered tool bit cartridge 200 can be adapted to the handle portion of hand power tool 350. Although a positional multi-chambered tool bit cartridge 200 is shown any manifestation of positional or non-positional multi-chambered tool bit cartridge may apply for this application.

While the present invention is thus described with what is considered the most practical and preferred embodiments, it is understood that this invention is not limited to the disclosed embodiments but is intended to cover all various arrangements included within the spirit and scope of the broadest interpretation of this invention.

What is claimed is:

1. A tool bit holder, comprising:
    a tool bit cartridge defined by side walls located opposite and facing away from each other, and at least one end wall that defines a curved, angled or staggered geometry, and
    a pivot point located on the side walls of the tool bit cartridge,
    wherein the tool bit cartridge includes tool bit storage holes in the at least one end wall, at least two of the tool bit storage holes defining different depths, and
    wherein the tool bit cartridge rotates about the pivot point within a cavity of a device.

2. The tool bit holder of claim 1, wherein the cavity is defined by cavity side walls located opposite and facing each other, cavity end walls that are curved, angled or staggered in shape to approximate the at least one end wall of the tool bit cartridge and are located opposite and facing each other, and at least one cavity opening.

3. The tool bit holder of claim 2, wherein the tool bit cartridge further defines a top surface and a bottom surface located opposite and facing away from each other, and wherein the side walls of the tool bit cartridge face the corresponding cavity side walls, the at least one end wall of the tool bit cartridge faces the corresponding cavity end walls, and at least one of the top surface and bottom surface of the tool bit cartridge is at least partially exposed through the at least one cavity opening when the tool bit cartridge is contained within the cavity and positioned in a closed position.

4. The tool bit holder of claim 3, wherein the tool bit storage holes are configured and dimensioned to receive tool bits of similar or dissimilar lengths, functions and size ranges.

5. The tool bit holder of claim 4, wherein the tool bits define a length longer than a depth of the tool bit storage holes, and wherein the tool bits partially protrude from the tool bit storage holes.

6. The tool bit holder of claim 5, wherein the at least one end wall defines a matrix including an x-axis, a y-axis, and a z-axis, the x-axis defined by at least one row of the tool bit storage holes, the y-axis defined by at least one column of the tool bit storage holes, and the z-axis defined by the depth of the tool bit storage holes, and wherein the depth of the tool bit storage holes is dimensioned such that exposed ends of the tool bits extending from the tool bit storage holes define a curved, angled or staggered geometry to substantially emulate the cavity end walls, the curved, angled or staggered geometry allowing for an offset formation that facilitates individual selection of densely arranged protruding tool bits.

7. The tool bit holder of claim 1, wherein at least one of the tool bit storage holes is a through-hole provision for storage of tool bits that protrude through a thickness of the tool bit cartridge and extend from the at least one end wall of the tool bit cartridge.

8. The tool bit holder of claim 2, wherein an axle at least partially extends from or is situated against the cavity side walls, or is integrated with the pivot point of the tool bit cartridge.

9. The tool bit holder of claim 6, wherein a geometrically symbiotic relation exists between the cavity end walls and (i) the at least one end wall of the tool bit cartridge, (ii) the exposed ends of the tool bits protruding from the tool bit storage holes, and (iii) an orbital course of the exposed ends of the tool bits protruding from the tool bit storage holes as the tool bit cartridge rotates within the cavity.

10. The tool bit holder of claim 9, wherein as the tool bit cartridge rotates within the cavity, the tool bits are exposed through the at least one cavity opening while the tool bit cartridge remains within the cavity.

11. The tool bit holder of claim 1, wherein the pivot point is located on the side walls of the tool bit cartridge and comprises at least one of (i) an axle bearing protruding from each of the side walls of the tool bit cartridge, (ii) a pivot hole extending through the tool bit cartridge configured and dimensioned to receive the axle bearing, and (iii) an axle bearing protruding from at least one of the cavity side walls.

12. The tool bit holder of claim 1, wherein the tool bit cartridge is at least one of (i) interchangeable with an alternative tool bit cartridge, (ii) configured and dimensioned to be grouped with at least one additional tool bit cartridge within the cavity while maintaining each tool bit cartridge as individually selectable, and (iii) configured and dimensioned to be grouped with the at least one additional tool bit cartridge within separate cavities while maintaining each tool bit cartridge as individually selectable.

13. The tool bit holder of claim 1, wherein the tool bit cartridge is interchangeable with an alternative tool bit cartridge.

14. The tool bit holder of claim 1, wherein an elastomeric overmold is clad to a portion of the tool bit cartridge to grip tool bits stored in the tool bit storage holes.

15. The tool bit holder of claim 2, wherein the tool bit cartridge is maintained in the closed position with at least one cartridge magnet mounted and circumscribed about the pivot point in at least one of the side walls of the tool bit cartridge and at least one cavity magnet with an opposite polarity from the at least one cartridge magnet mounted and circumscribed in at least one of the cavity side walls opposing the at least one cartridge magnet, and wherein the tool bit cartridge is positioned in one or more radial locations by rotating the tool bit cartridge about the pivot point.

16. The tool bit holder of claim 2, wherein the tool bit cartridge is maintained in the closed position with at least one magnet mounted and circumscribed about the pivot point in at least one of the side walls of the tool bit cartridge or the cavity side walls of the cavity and at least one ferromagnetic position locator mounted and circumscribed in at least one of the cavity side walls or the side walls of the tool bit cartridge opposing the at least one magnet, and wherein the tool bit cartridge is positioned in one or more radial locations by rotating the tool bit cartridge about the pivot point.

17. The tool bit holder of claim 2, further comprising a structural support element or fastener extending through or fixed to a first cavity side wall, extending through the pivot point of the tool bit cartridge, and extending through an opposing second cavity side wall, the structural support element or fastener being coupled with a mating fastener or fixed to the opposing second cavity side wall.

18. A tool bit holder, comprising:
a tool bit cartridge defined by side walls located opposite and facing away from each other, and defined by first and second end walls located opposite and facing away from each other,
a first set of tool bit storage holes located in the first end wall,
a second set of tool bit storage holes located in the second end wall, and
a pivot point located on the side walls of the tool bit cartridge,
wherein at least one of the first and second sets of tool bit storage holes is dimensioned such that exposed ends of tool bits extending from the at least one of the first and second sets of tool bit storage holes produce a curved, angled or staggered geometry, the curved, angled or staggered geometry being defined by an exposed end of a first tool bit extending a different height relative to an exposed end of a second tool bit, and
wherein the tool bit cartridge rotates about the pivot point within a cavity of a device.

19. A tool bit holder, comprising:
a tool bit cartridge defined by side walls located opposite and facing away from each other, and defined by end walls located opposite and facing away from each other,
tool bit storage holes located in at least one of the end walls, and
a pivot point located on the side walls of the tool bit cartridge,
wherein a depth of the tool bit storage holes is dimensioned such that exposed ends of tool bits extending from the tool bit storage holes produce a curved, angled or staggered geometry, the curved, angled or staggered geometry being defined by an exposed end of a first tool bit extending a different height relative to an exposed end of a second tool bit, and
wherein the tool bit cartridge rotates about the pivot point within a cavity of a device.

20. The tool bit holder of claim 19, wherein the curved, angled or staggered geometry of the exposed ends of the tool bits facilitates individual selection of densely arranged tool bits from the tool bit storage holes.

\* \* \* \* \*